(12) United States Patent
Sasaki et al.

(10) Patent No.: US 8,988,975 B1
(45) Date of Patent: Mar. 24, 2015

(54) THERMALLY ASSISTED MAGNETIC HEAD, METHOD OF MANUFACTURING THE SAME, HEAD GIMBAL ASSEMBLY, AND HARD DISK DRIVE

(71) Applicants: Yoshitaka Sasaki, Milpitas, CA (US); Hiroyuki Ito, Milpitas, CA (US); Hironori Araki, Milpitas, CA (US); Shigeki Tanemura, Milpitas, CA (US); Kazuki Sato, Milpitas, CA (US); Ryuji Fujii, Hong Kong (CN)

(72) Inventors: Yoshitaka Sasaki, Milpitas, CA (US); Hiroyuki Ito, Milpitas, CA (US); Hironori Araki, Milpitas, CA (US); Shigeki Tanemura, Milpitas, CA (US); Kazuki Sato, Milpitas, CA (US); Ryuji Fujii, Hong Kong (CN)

(73) Assignees: Headyway Technologies, Inc., Milpitas, CA (US); SAE Magnetics (H.K.) Ltd., Hong Kong (CN)

( * ) Notice: Subject to any disclaimer, the term of this patent is extended or adjusted under 35 U.S.C. 154(b) by 42 days.

(21) Appl. No.: 14/035,015

(22) Filed: Sep. 24, 2013

(51) Int. Cl.
  *G11B 11/00* (2006.01)
  *G11B 5/48* (2006.01)
  *G11B 5/127* (2006.01)
  *G11B 5/00* (2006.01)

(52) U.S. Cl.
  CPC .............. *G11B 5/486* (2013.01); *G11B 5/127* (2013.01); *G11B 2005/0021* (2013.01)
  USPC .............. 369/13.33; 369/13.13; 369/112.27; 360/59; 360/125.31

(58) Field of Classification Search
  CPC .......... G11B 2005/0021; G11B 5/314; G11B 5/6088; G11B 2005/0005; G11B 5/3163; G11B 5/02; G11B 7/1387; G11B 5/3116; G11B 2005/001; G11B 5/4866; G11B 5/1278; G11B 2005/0002; G11B 11/10536; G11B 5/73
  USPC .......... 369/13.33, 13.32, 13.24, 13.14, 13.03, 369/13.02, 13.12, 13.13, 13.01, 112.27; 360/59, 125.31, 125.74, 128, 317
  See application file for complete search history.

(56) References Cited

U.S. PATENT DOCUMENTS

| 8,208,214 B2 * | 6/2012 | Iwata et al. ..................... 360/59 |
| 8,619,518 B1 * | 12/2013 | Sasaki et al. ............... 369/13.33 |
| 8,830,799 B1 * | 9/2014 | Sasaki et al. ............... 369/13.33 |
| 8,867,170 B1 * | 10/2014 | Sasaki et al. ............... 360/125.3 |

FOREIGN PATENT DOCUMENTS

| JP | A-2005-004901 | 1/2005 |
| JP | A-2007-164935 | 6/2007 |
| JP | A-2007-257753 | 10/2007 |
| JP | A-2008-257819 | 10/2008 |
| JP | A-2012-003830 | 1/2012 |

* cited by examiner

*Primary Examiner* — Ali Neyzari
(74) *Attorney, Agent, or Firm* — Oliff PLC

(57) ABSTRACT

A thermally assisted magnetic head includes a main magnetic pole layer, a near-field light generating layer having a generating end part generating near-field light arranged within a medium-opposing surface, and an optical waveguide guiding light to the near-field light generating layer. The near-field light generating layer has a laminated structure in which a first thin-film metal layer formed in a thin film form along a direction intersecting the medium-opposing surface and a second thin-film metal layer formed in a thin film form and formed using a second metal larger in hardness than a first metal forming the first thin-film metal layer are alternately laminated. Further, in the second thin-film metal layer, a defect part is formed, the defect part is a part smaller in thickness than another part or is a hole part, and a flat layer part other than the defect part surrounds the defect part.

20 Claims, 41 Drawing Sheets

Fig.10
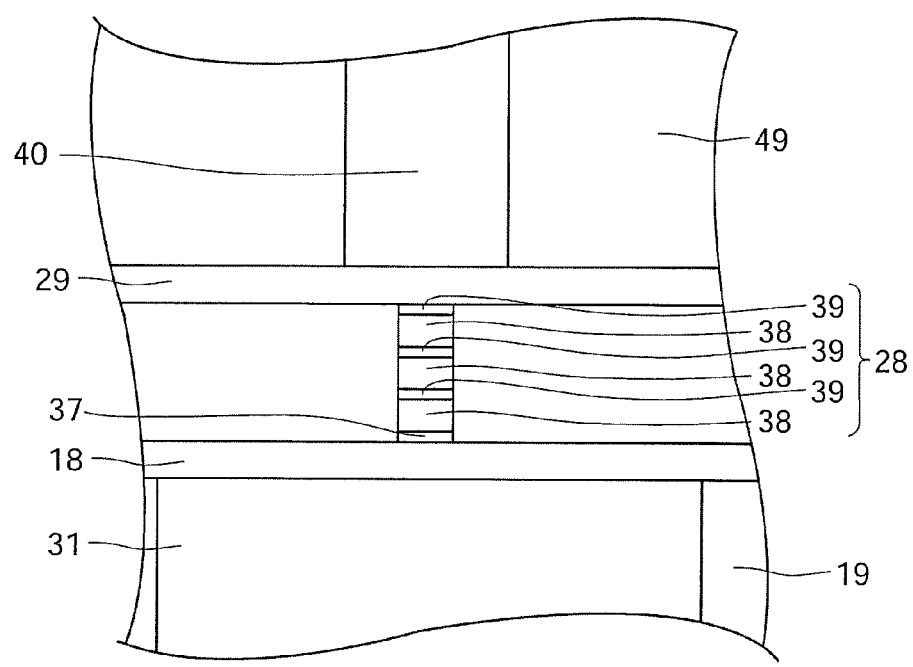
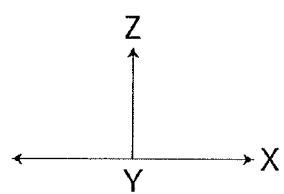

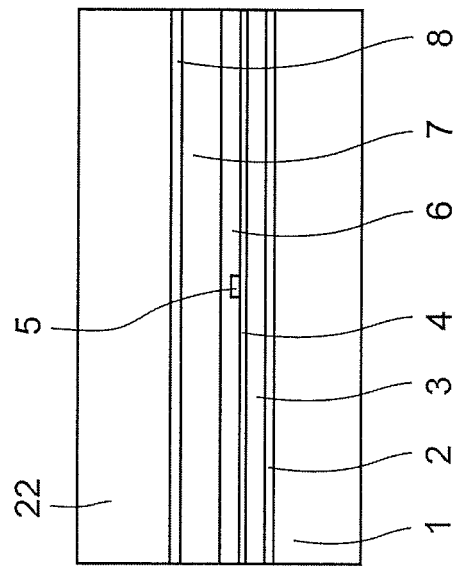
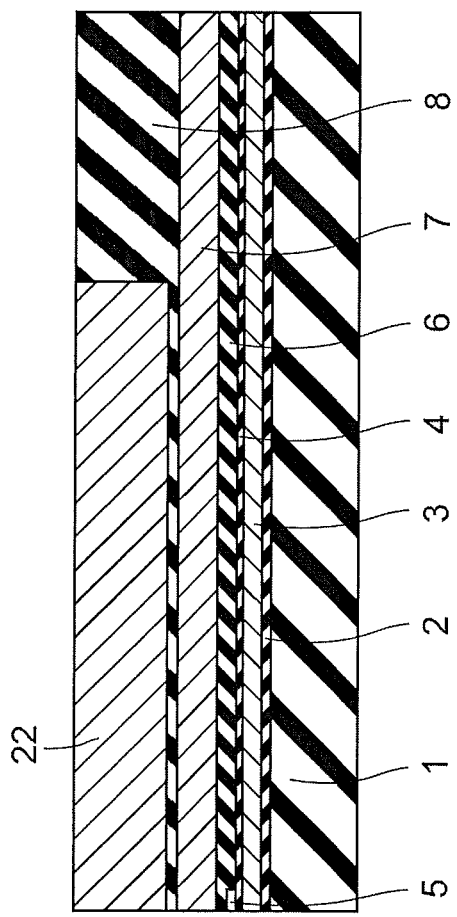
Fig. 12(A)
Fig. 12(B)

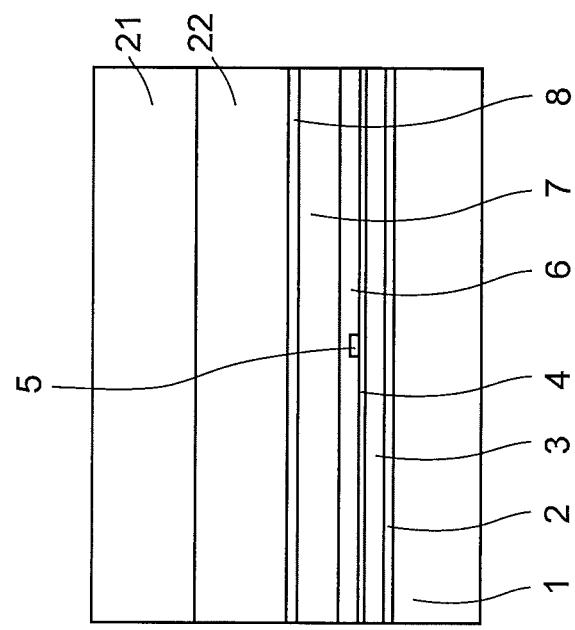
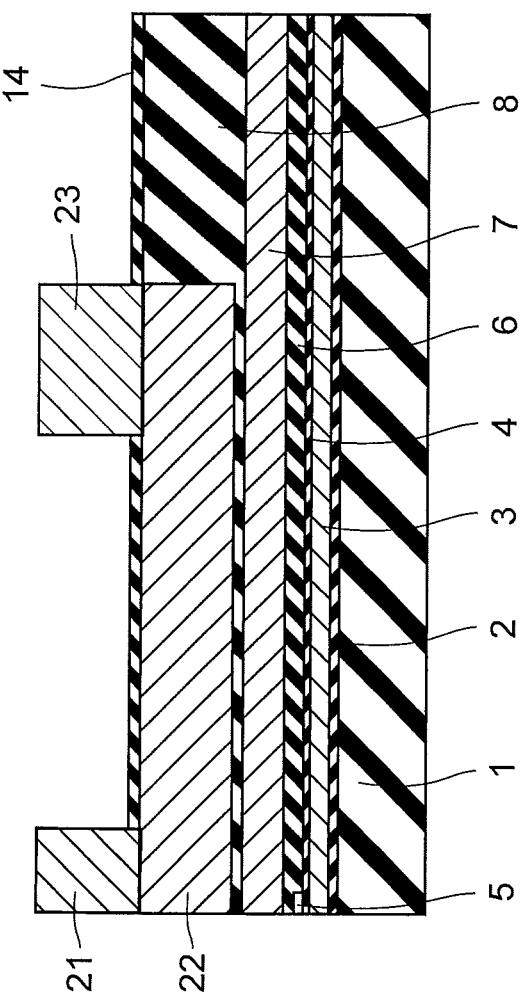
Fig. 13(A)
Fig. 13(B)

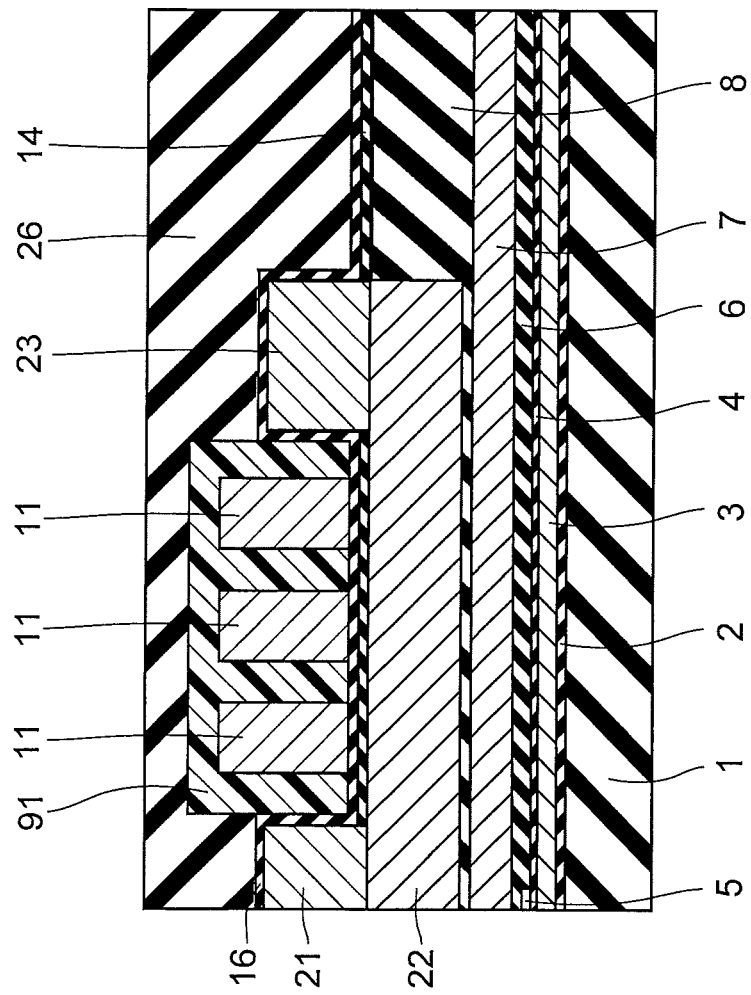
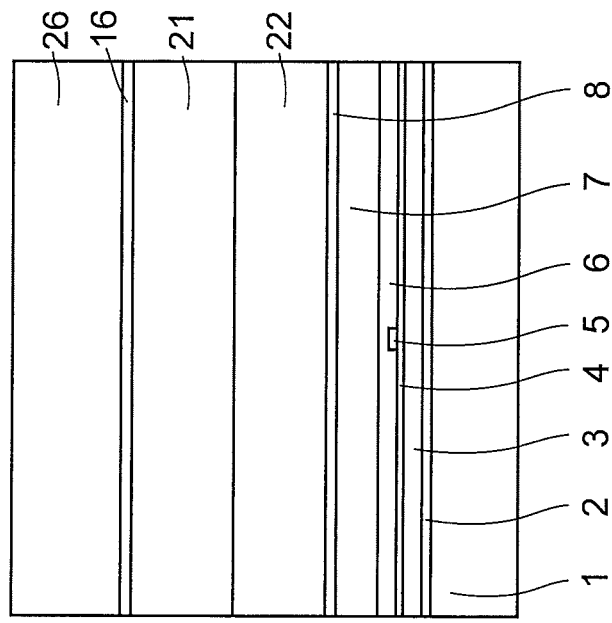
Fig. 14(A)
Fig. 14(B)

THERMALLY ASSISTED MAGNETIC HEAD, METHOD OF MANUFACTURING THE SAME, HEAD GIMBAL ASSEMBLY, AND HARD DISK DRIVE

BACKGROUND

1. Field of the Invention

The present invention relates to a thermally assisted magnetic head recording data on a magnetic recording medium by thermally assisted magnetic recording using near-field light and a method of manufacturing the same, and a head gimbal assembly and a hard disk drive each having a thermally assisted magnetic head.

2. Related Background Art

In recent years, as hard disk drives have been increasing their recording densities, thin-film magnetic heads recording data on magnetic recording media have been required to further improve their performances. As the thin-film magnetic heads, those of composite type having a structure in which a reproducing head having a magnetoresistive device (hereinafter, referred to also as an "MR device") for read and a recording head having an electromagnetic coil device for write are laminated have been conventionally in wide use. In a magnetic disk drive, the thin-film magnetic head is provided on a slider which very slightly floats from the magnetic recording medium.

Incidentally, the magnetic disk drive records data by magnetizing magnetic fine particles on the magnetic recording medium using the recording head. In order to increase the recording density of the magnetic recording medium, it is effective to make the magnetic fine particles smaller.

When the magnetic fine particles are made smaller, however, there arises a problem that the magnetization thereof becomes unstable with respect to heat as the particles reduce in volume, thereby increasing the possibility that the data recorded on the magnetic recording medium is lost. To solve the problem, it is effective to increase the magnetic energy of the magnetic fine particles to thereby enhance the stability of magnetization. When the magnetic energy of the magnetic fine particles is increased, however, there arises another problem that the coercive force (difficulty in reversing magnetization) of the magnetic recording medium increases to deteriorate the data recording performance.

To solve such problems, a method called thermally assisted magnetic recording has been conventionally proposed. When recording data on a magnetic recording medium having a large coercive force, the thin-film magnetic head employing the thermally assisted magnetic recording (hereinafter, referred to as a "thermally assisted magnetic head") records data while instantaneously heating and thereby increasing the temperature of a portion of the magnetic recording medium where data will be recorded.

Since the magnetic fine particles decrease in coercive force when the temperature is increased, instantaneous heating makes it possible to record data even on the magnetic recording medium having a high coercive force at room temperature. The portion of the magnetic recording medium where the data has been recorded is decreased in temperature after the recording of data and thereby increases in coercive force. Therefore, by using the thermally assisted magnetic head, it becomes possible to make the magnetic fine particles finer as well as stabilize recording in the magnetic disk drive.

On the other hand, near-field light is used as means for heating the magnetic recording medium in the conventional thermally assisted magnetic head. When light enters an opening smaller than the wavelength of light, the light slightly seeps from the opening and locally exists near the opening. The light locally existing near the opening is called near-field light. The near-field light is confined in a region much smaller than that of a spot light obtained by collecting light using a lens, so that use of the near-field light makes it possible to heat only a limited extremely small recording region of the magnetic recording medium.

Known as a method of generating the near-field light in the conventional thermally assisted magnetic head is a method using a plasmon generator (also called a plasmon probe) that is a minute metal piece. In this method, the near-field light is generated by guiding laser light to the plasmon generator via an optical waveguide.

As a conventional plasmon generator, a light scattering body in a triangular thin plate structure is disclosed in Japanese Patent Application Laid-Open No. 2005-4901 (referred also to as patent document 1), for example. Further, a plasmon probe made of metal such as gold, silver, aluminum or the like in the shape of a triangle pole is disclosed in Japanese Patent Application Laid-Open No. 2007-257753 (referred also to as patent document 2). Furthermore, a near-field light generating part in an isosceles triangle including a tip end reaching a medium-opposing surface is disclosed in Japanese Patent Application Laid-Open No. 2007-164935 (referred also to as patent document 3). A near-field light generating part in a triangle pole shape formed on an optical waveguide is disclosed in Japanese Patent Application Laid-Open No. 2012-3830 (referred also to as patent document 4). A near-field light generating part in a triangle shape formed on an optical emitting surface of a medium-opposing surface side of an optical waveguide is disclosed in Japanese Patent Application Laid-Open No. 2008-257819 (referred also to as patent document 5).

SUMMARY OF THE INVENTION

As described above, in the conventional thermally assisted magnetic head, the laser light are guided to the plasmon generator to excite surface plasmons to generate the near-field light based on the surface plasmons. This near-field light is used as means for heating the magnetic recording medium.

The plasmon generator, however, generates heat in itself accompanying the generation of the near-field light. In addition, the plasmon generator has a very small size and made of metal such as gold, silver, aluminum, palladium or the like and thus causes self expansion due to its own heat generation. Then, since the thermally assisted magnetic head has a medium-opposing surface opposing the magnetic recording medium and the plasmon generator has a tip end portion reaching the medium-opposing surface, the tip end portion projects to approach from the medium-opposing surface to the magnetic recording medium. Thus, the conventional thermally assisted magnetic head has a problem that the medium-opposing surface is likely to project and collide with the magnetic recording medium due to the magnetic recording action.

Further, the plasmon generator is likely to melt, when it becomes high temperature due to the self heat generation. Then, the shape of the plasmon generator changes, and thereby it becomes difficult that an extremely small recording region of the magnetic recording medium is heated intensively.

In addition, after the self-expansion due to the self heat generation, the plasmon generator shrinks when it's temperature falls down. On that occasion, a front end face of the plasmon generator sometimes has receded more than another part of the medium-opposing surface.

To increase the recording density in a magnetic recording apparatus, a smaller spot diameter of the near-field light is more preferable. To generate the near-field light having a small spot diameter and sufficient intensity, it is effective to concentrate much surface plasmons to the tip end part of the plasmon generator. In such a configuration, however, there is another problem that though near-field light having a high electric field intensity is generated from the tip end part, the generated heat also increases to cause the tip end part to be more likely to project from the medium-opposing surface and to be more likely to melt.

In addition, gold or silver is softer than other metals and thus causes especially the following problem when the plasmon generator is formed only of gold or silver. Specifically, polishing for forming the medium-opposing surface is performed in the manufacturing process of the thermally assisted magnetic head. In this event, etching is sometimes performed on a portion to be polished, and the etching sometimes causes the plasmon generator to recede more than the other part of the medium-opposing surface.

For the above-described reasons, there is a problem that the reliability of the thermally assisted magnetic head is low, especially when the plasmon generator is formed only of gold or silver.

The present invention is made to solve the above problems, and it is an object to provide a thermally assisted magnetic head having a structure in which projection, melting, deformation and recess of a plasmon generator is reduced to increase the reliability of the thermally assisted magnetic head and a method of manufacturing the same, and a head gimbal assembly and a hard disk drive each including the thermally assisted magnetic head.

To solve the above problems, the present invention is a thermally assisted magnetic head including a main magnetic pole layer having a magnetic pole end face arranged within a medium-opposing surface opposing a magnetic recording medium; a near-field light generating layer having a generating end part arranged within the medium-opposing surface, the generating end part generating near-field light for heating the magnetic recording medium; and an optical waveguide guiding light to the near-field light generating layer, the near-field light generating layer has a laminated structure in which a first thin-film metal layer formed in a thin film form along a direction intersecting the medium-opposing surface and a second thin-film metal layer formed in a thin film form along the direction intersecting the medium-opposing surface and formed using a second metal larger in hardness than a first metal forming the first thin-film metal layer are alternately laminated, and in the second thin-film metal layer, a defect part is formed, the defect part is a part smaller in thickness than another part or is a hole part, and a flat layer part other than the defect part surrounds the defect part.

In the thermally assisted magnetic head, the near-field light generating layer has a laminated structure in which a first thin-film metal layer and a second thin-film metal layer are alternately laminated, a defect part is formed in the second thin-film metal layer, and a flat layer part other than the defect part surrounds the defect part. The second thin-film metal layer is formed using a second metal larger in hardness than a first metal and thus exerts an effect of stopping deformation of the first thin-film metal layer, and the defect part is formed in the second thin-film metal layer to reduce the volume of the second metal contained in the near-field light generating layer.

In the above-described thermally assisted magnetic head, it is preferable that in the near-field light generating layer, at least two second thin-film metal layers are laminated, and the first thin-film metal layer is laminated between the two second thin-film metal layers, and the second thin-film metal layer has a net-like structure in which a plurality of the defect parts are scattered not in contact with one another and the flat layer part surrounds the respective defect parts, the flat layer part continues without a break due to the defect parts.

When the second thin-film metal layer has a net-like structure in which the flat layer part continues without a break due to the defect parts, the defect parts are arranged in balanced manner, so that the second thin-film metal layer maintains its outer shape even if external force is applied thereto from any direction.

Further, in the above-described thermally assisted magnetic head, it is preferable that the optical waveguide has a waveguide end face arranged within the medium-opposing surface, and extends in a depth direction intersecting the medium-opposing surface from the waveguide end face, and has an upper end face on a side closer to the main magnetic pole layer, the thermally assisted magnetic head further includes an interposed layer which is in direct contact with the upper end face of the optical waveguide, and a closely adhesive layer which makes the near-field light generating layer closely adhere to the interposed layer, and in the closely adhesive layer, a closely adhesive layer defect part similar to the defect part in the second thin-film metal layer is formed and a closely adhesive layer flat layer part other than the closely adhesive layer defect part surrounds the closely adhesive layer defect part.

The thermally assisted magnetic head has the closely adhesive layer, whereby the adhesion between the near-field light generating layer and the interposed layer increases, and thereby it becomes difficult that the near-field light generating layer exfoliate from the interposed layer.

Further, in the above-described thermally assisted magnetic head, it is preferable that the optical waveguide has a waveguide end face arranged within the medium-opposing surface, and extends in a depth direction intersecting the medium-opposing surface from the waveguide end face, and has an upper end face on a side closer to the main magnetic pole layer, the thermally assisted magnetic head further includes an interposed layer which is in direct contact with the upper end face of the optical waveguide, and a closely adhesive layer which makes the near-field light generating layer closely adhere to the interposed layer, and the closely adhesive layer has a net-like structure in which a plurality of closely adhesive layer defect parts similar to the defect parts in the second thin-film metal layer are scattered not in contact with one another and a closely adhesive layer flat layer part other than the closely adhesive layer defect parts surrounds the respective closely adhesive layer defect parts, the closely adhesive layer flat layer part continues without a break due to the closely adhesive layer defect parts.

Further, it is possible that the second thin-film metal layer has a quasi-honeycomb structure approximate to a honeycomb structure in which each of the plurality of defect parts is formed in a hexagonal shape.

It is possible that the second thin-film metal layer has an annular structure, the annular structure is a structure in which a part of the second thin-film metal layer disposed along an outer peripheral part of it and distanced at an almost regular interval from the outer peripheral part is formed as the flat layer part, and only one defect part is formed inside the flat layer part.

Further, it is possible that the closely adhesive layer has an annular structure, the annular structure is a structure in which a part of the closely adhesive layer disposed along an outer peripheral part of it and distanced at an almost regular interval from the outer peripheral part is formed as the closely adhesive layer flat layer part, and only one closely adhesive layer defect part is formed inside the closely adhesive layer flat layer part.

It is preferable that the first thin-film metal layer is formed to be smaller in thickness than the second thin-film metal layer.

It is preferable that in the near-field light generating layer, the second thin-film metal layer is laminated on the outside most distant from the optical waveguide.

Further, in the above-described thermally assisted magnetic head, it is preferable that in the near-field light generating layer, only a near-field light generating part having the generating end part on the magnetic recording medium side has the laminated structure, and a metal component part formed using the first metal is disposed at a part more distant from the medium-opposing surface than is the near-field light generating part.

It is also possible that in the near-field light generating layer, a sloping surface sloping with respect to the medium-opposing surface is formed in the near-field light generating part having the generating end part on the magnetic recording medium side.

It is also possible that the optical waveguide has a depression formed on the upper end face, and the near-field light generating layer is formed integrally with a metal component part, the metal component part is formed inside the depression using the first metal.

Further, the present invention provides a method of manufacturing a thermally assisted magnetic head including a main magnetic pole layer having a magnetic pole end face arranged within a medium-opposing surface opposing a magnetic recording medium; a near-field light generating layer having a generating end part arranged within the medium-opposing surface, the generating end part generating near-field light for heating the magnetic recording medium; and an optical waveguide guiding light to the near-field light generating layer, including a near-field light generating layer forming step of forming the near-field light generating layer, the near-field light generating layer forming step including the following steps (1) to (3):

(1) a first metal layer forming step of forming a first metal layer in a thin film form along a direction intersecting the medium-opposing surface (2) a second metal layer forming step of forming, on the first metal layer, a second metal layer in a thin film form along the direction intersecting the medium-opposing surface using a second metal larger in hardness than a first metal forming the first metal layer (3) a metal layer defect step of forming a defect part in the second metal layer, the defect part is a part smaller in thickness than another part or is a hole part, such that a flat layer part other than the defect part surrounds the defect part.

In the above-described method of manufacturing, it is preferable that the metal layer defect step is performed such that a plurality of the defect parts are scattered not in contact with one another and the flat layer part surrounds the respective defect parts, and the flat layer part continues without a break due to the defect parts, to make the second metal layer have a net-like structure composed of the plurality of defect parts and the flat layer part.

In the above-described method of manufacturing, it is preferable that the method of manufacturing a thermally assisted magnetic head further including an optical waveguide forming step of forming an optical waveguide on a surface of a laminated body to have a rectangular parallelepiped-shape part on a side of a planned opposing surface position which will become the medium-opposing surface afterward; an interposed layer forming step of forming an interposed layer using a dielectric substance on an upper end face of the optical waveguide; a metal thin-film layer forming step of forming a metal thin-film layer which becomes a closely adhesive layer afterward, the closely adhesive layer making the near-field light generating layer closely adhere to the interposed layer; and a closely adhesive layer defect step of forming, in the metal thin-film layer, a closely adhesive layer defect part similar to the defect part in the second metal layer such that a closely adhesive layer flat layer part other than the closely adhesive layer defect part surrounds the closely adhesive layer defect part.

Further, it is preferable that the closely adhesive layer defect step is performed such that a plurality of the closely adhesive layer defect parts are scattered not in contact with one another and the closely adhesive layer flat layer part surrounds the respective closely adhesive layer defect parts, and the closely adhesive layer flat layer part continues without a break due to the closely adhesive layer defect parts to make the metal thin-film layer have a net-like structure composed of the plurality of closely adhesive layer defect parts and the closely adhesive layer flat layer part.

It is possible that the metal layer defect step is performed such that each of the plurality of defect parts is formed in a hexagonal shape to make the second metal layer have a quasi-honeycomb structure approximate to a honeycomb structure.

In case of the above-described method of manufacturing, it is preferable that the second metal layer forming step is performed such that the second metal layer is laminated on the outside most distant from the optical waveguide.

Further, the present invention provides a head gimbal assembly including a slider having a thermally assisted magnetic head formed thereon, the thermally assisted magnetic head including a main magnetic pole layer having a magnetic pole end face arranged within a medium-opposing surface opposing a magnetic recording medium; a near-field light generating layer having a generating end part arranged within the medium-opposing surface, the generating end part generating near-field light for heating the magnetic recording medium; and an optical waveguide guiding light to the near-field light generating layer, the near-field light generating layer has a laminated structure in which a first thin-film metal layer formed in a thin film form along a direction intersecting the medium-opposing surface and a second thin-film metal layer formed in a thin film form along the direction intersecting the medium-opposing surface and formed using a second metal larger in hardness than a first metal forming the first thin-film metal layer are alternately laminated, and in the second thin-film metal layer, a defect part is formed, the defect part is a part smaller in thickness than another part or is a hole part, and a flat layer part other than the defect part surrounds the defect part.

Further, the present invention provides a hard disk drive including a head gimbal assembly having a thermally assisted magnetic head, and a magnetic recording medium opposing the thermally assisted magnetic head, the thermally assisted magnetic head including a main magnetic pole layer having a magnetic pole end face arranged within a medium-opposing surface opposing the magnetic recording medium; a near-field light generating layer having a generating end part arranged within the medium-opposing surface, the generating end part generating near-field light for heating the magnetic recording medium; and an optical waveguide guiding light to the near-field light generating layer, the near-field light generating layer has a laminated structure in which a first thin-film metal layer formed in a thin film form along a direction intersecting the medium-opposing surface and a second thin-film metal layer formed in a thin film form along the direction intersecting the medium-opposing surface and formed using a second metal larger in hardness than a first metal forming the first thin-film metal layer are alternately laminated, and in the second thin-film metal layer, a defect part is formed, the defect part is a part smaller in thickness than another part or is a hole part, and a flat layer part other than the defect part surrounds the defect part.

The present invention will be more fully understood from the detailed description given hereinbelow and the accompanying drawings which are given by way of illustration only, and thus are not to be considered as limiting the present invention.

BRIEF DESCRIPTION OF THE DRAWINGS

FIG. 10 is a front view similar to FIG. 2, illustrating principal part of the thermally assisted magnetic head in accordance with an embodiment of the present invention;

FIG. 12 is a view illustrating a process of manufacturing the thermally assisted magnetic head in accordance with an embodiment of the present invention, in which (A) is a sectional view corresponding to FIG. 1, (B) is a front view corresponding to FIG. 2;

FIG. 13 is a view illustrating a process subsequent to that in FIG. 12, in which (A) is a sectional view corresponding to FIG. 1, (B) is a front view corresponding to FIG. 2;

FIG. 14 is a view illustrating a process subsequent to that in FIG. 13, in which (A) is a sectional view corresponding to FIG. 1, (B) is a front view corresponding to FIG. 2;

DETAILED DESCRIPTION OF THE EMBODIMENTS

In the following, embodiments of the present invention will be described with reference to the drawings. Note that the same components will be referred to with the same numerals or letters, while omitting their overlapping descriptions.

(Structures of Thermally Assisted Magnetic Head)

To begin with, the structure of a thermally assisted magnetic head will be explained with reference to FIG. 1 to FIG. 11.

Figure 1:
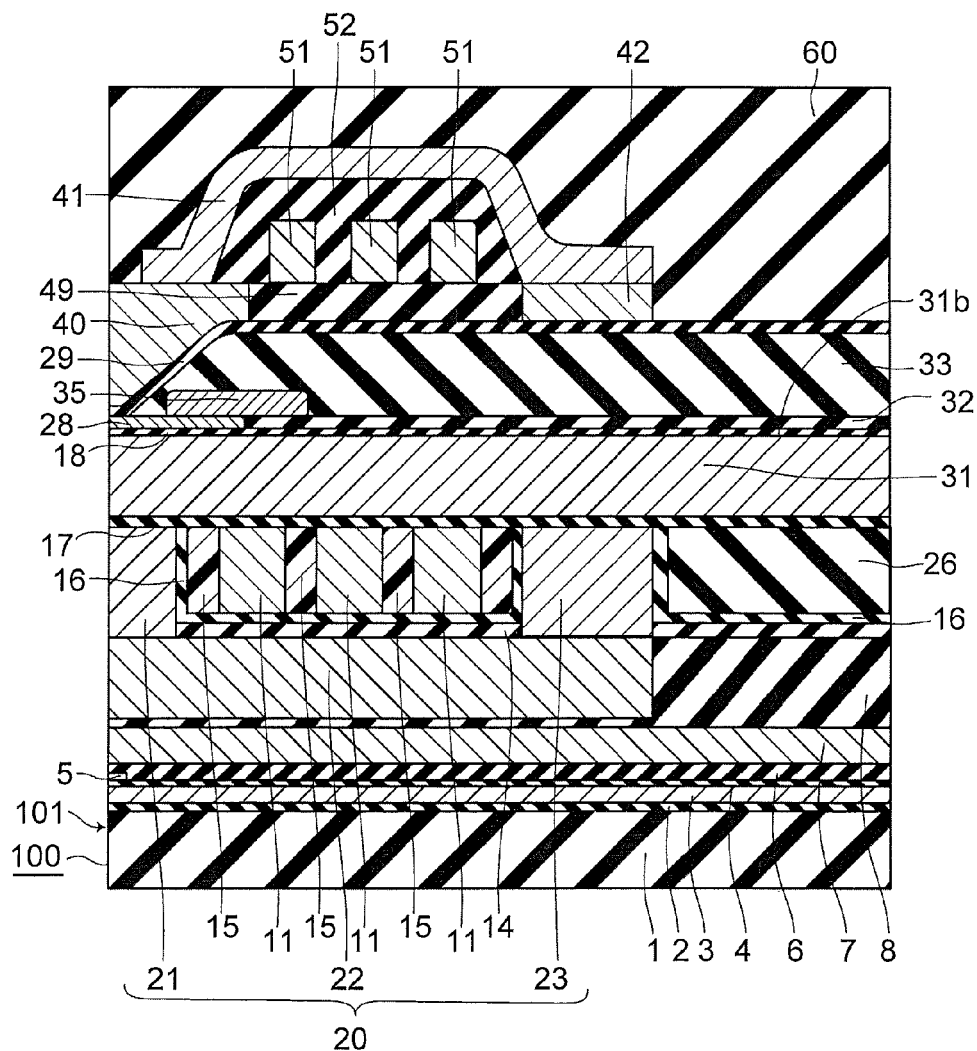
FIG. 1 is a sectional view of the thermally assisted magnetic head in accordance with an embodiment of the present invention taken along the line 1-1 of FIG. 2, which is a direction intersecting with an air bearing surface (which will hereinafter be referred also to as "ABS")
Figure 2:
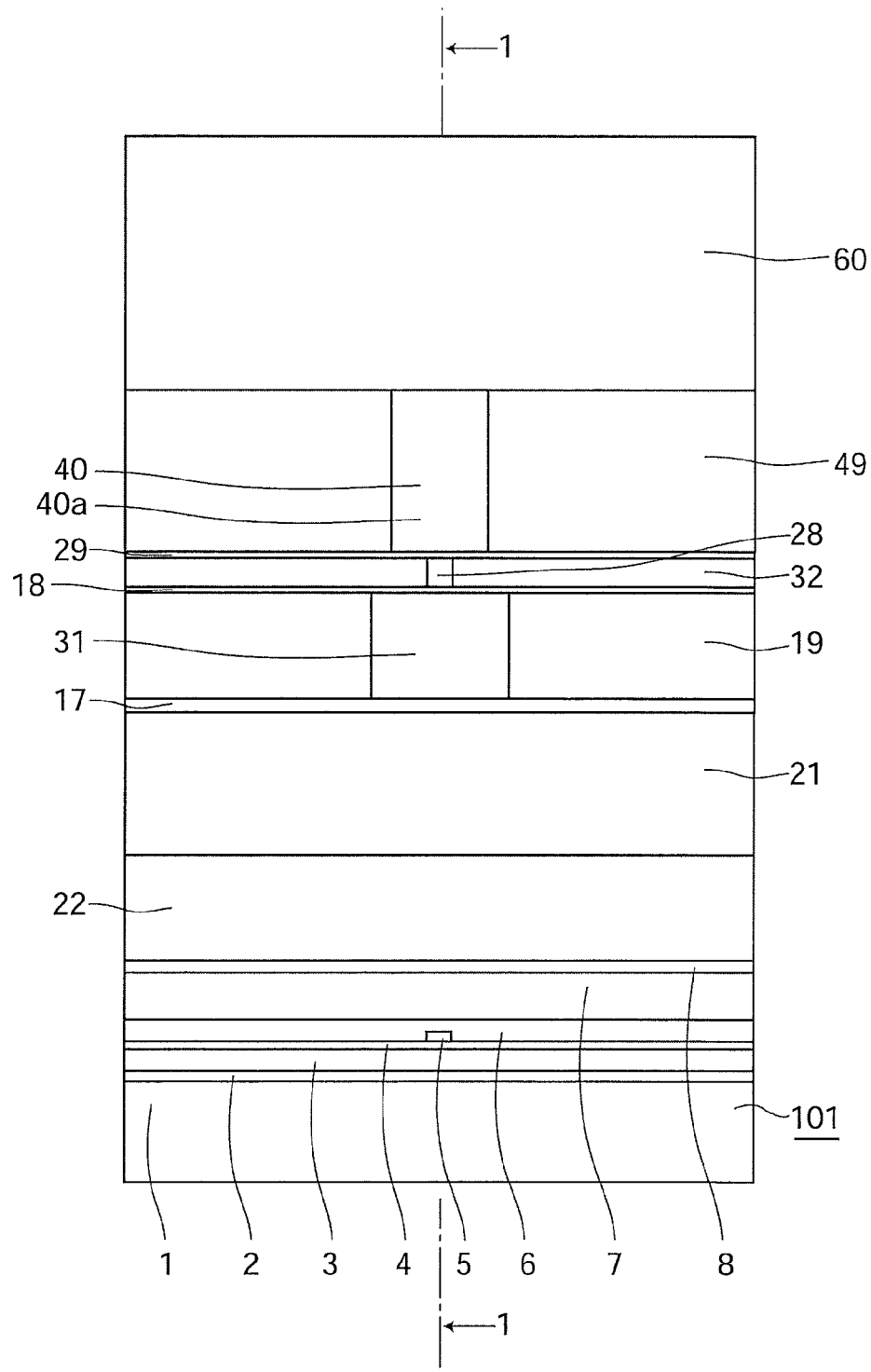
FIG. 2 is a front view illustrating the ABS of the thermally assisted magnetic head.
Figure 3:
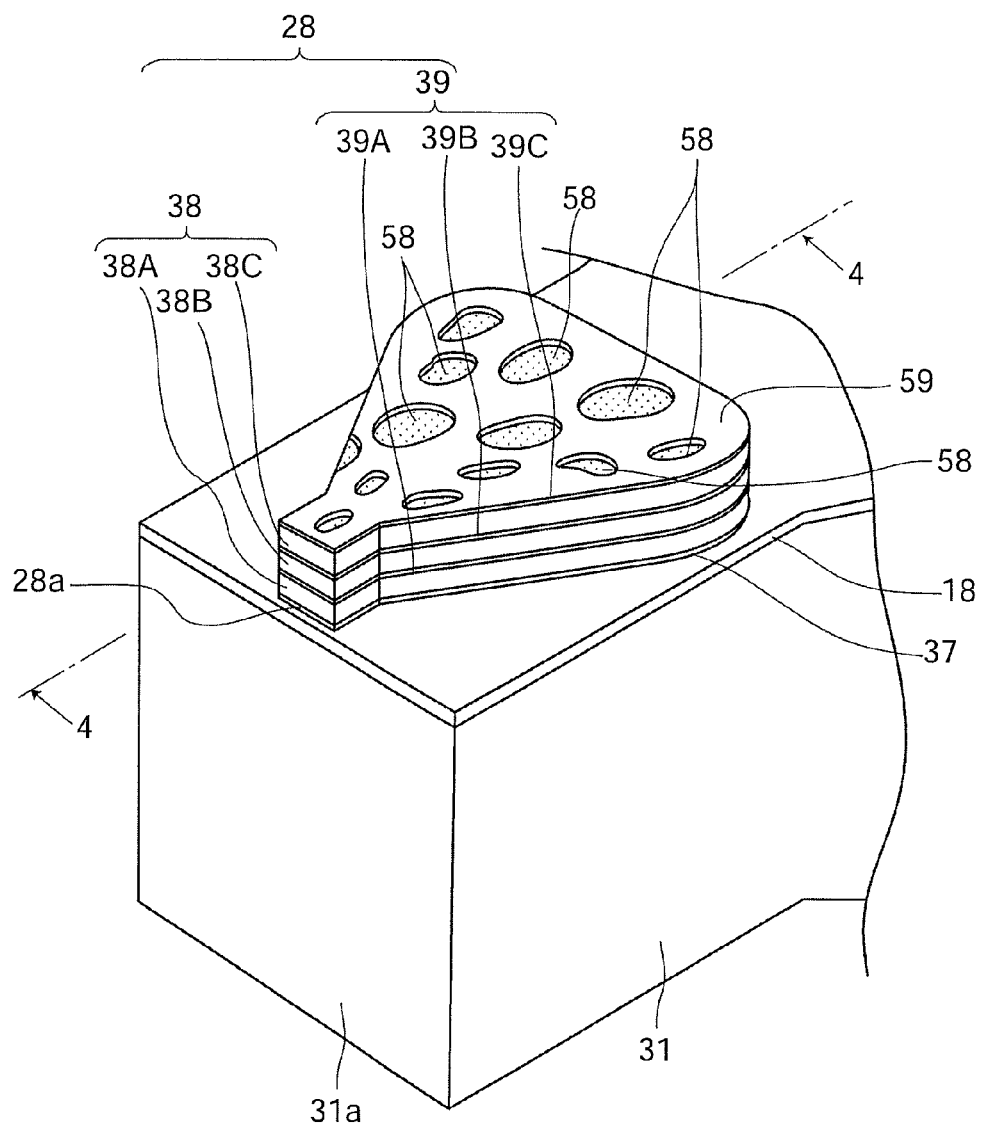
FIG. 3 is a perspective view illustrating principal parts of a near-field light generating layer, a closely adhesive layer, an interposed layer and an optical waveguide.
Figure 4:
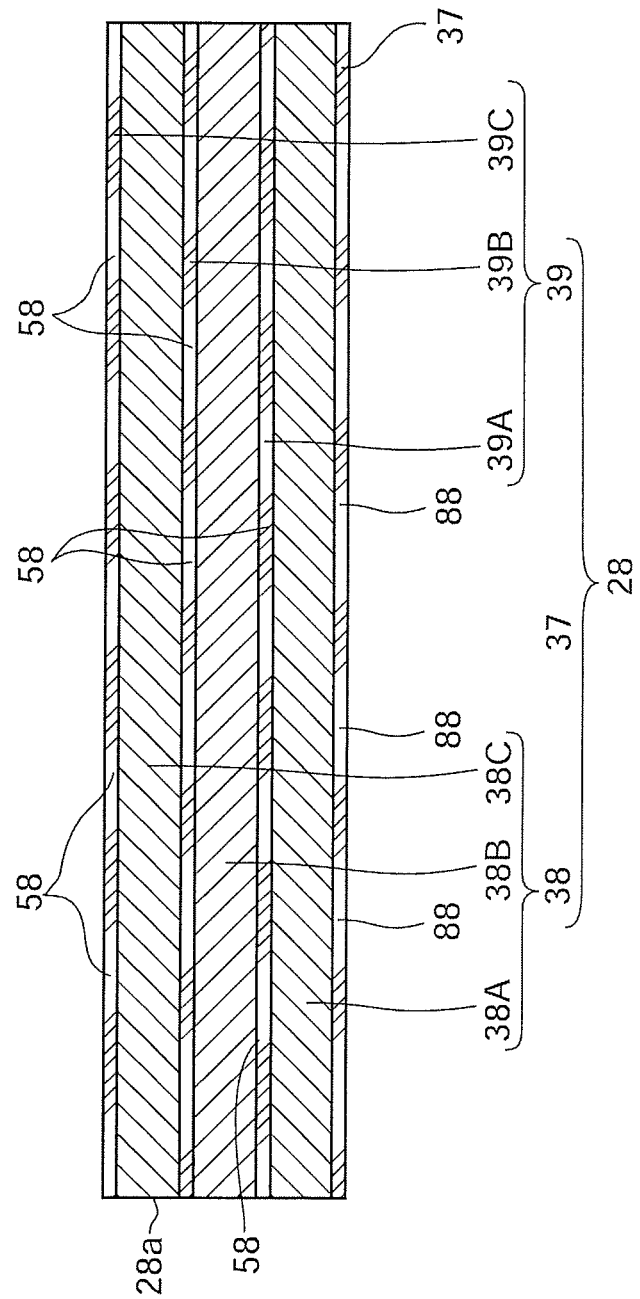
FIG. 4 is a sectional view of the near-field light generating layer and closely adhesive layer taken along the line 4-4 in FIG. 3.
Figure 5:
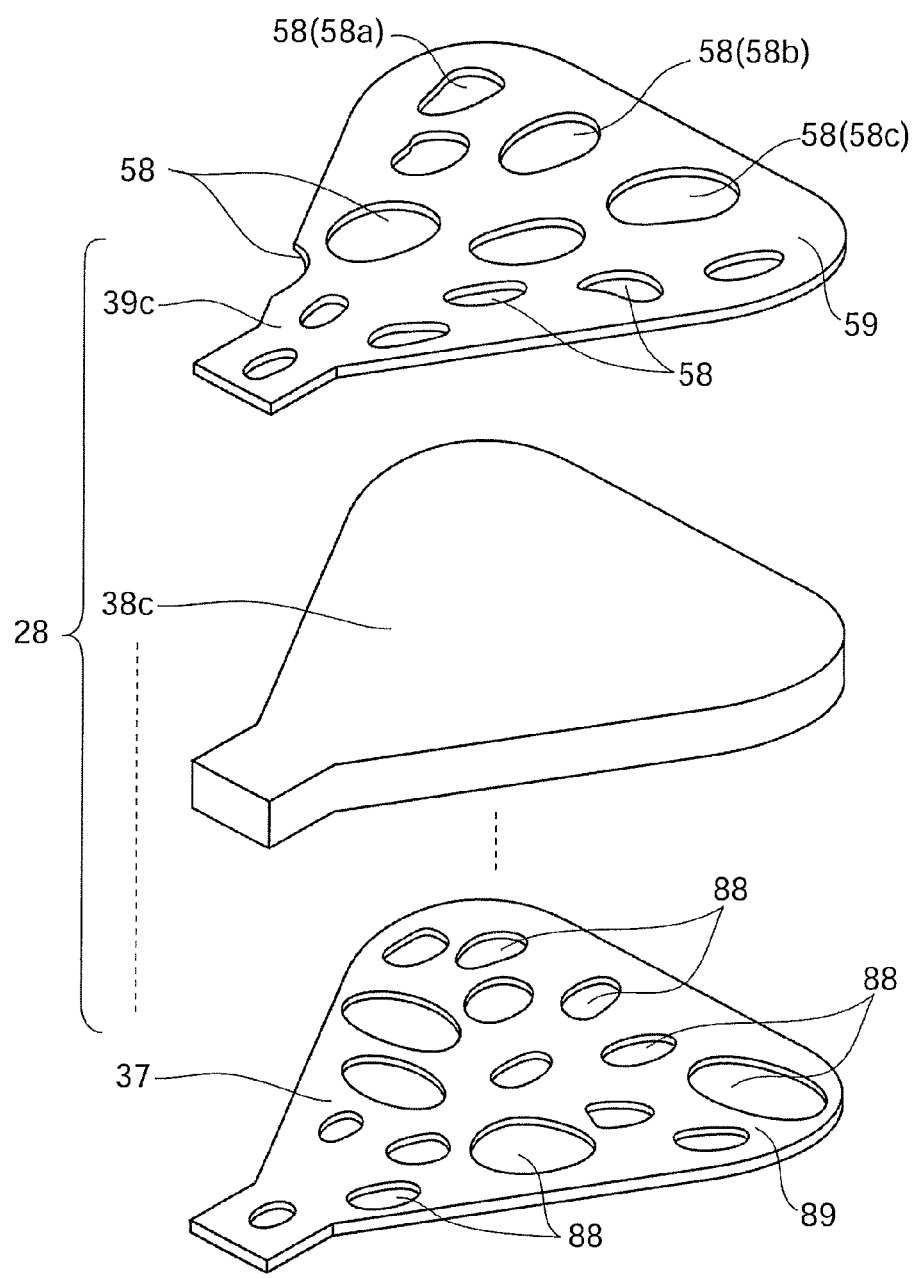
FIG. 5 is an exploded perspective view of the near-field light generating layer and closely adhesive layer, which are partially omitted.
Figure 6:
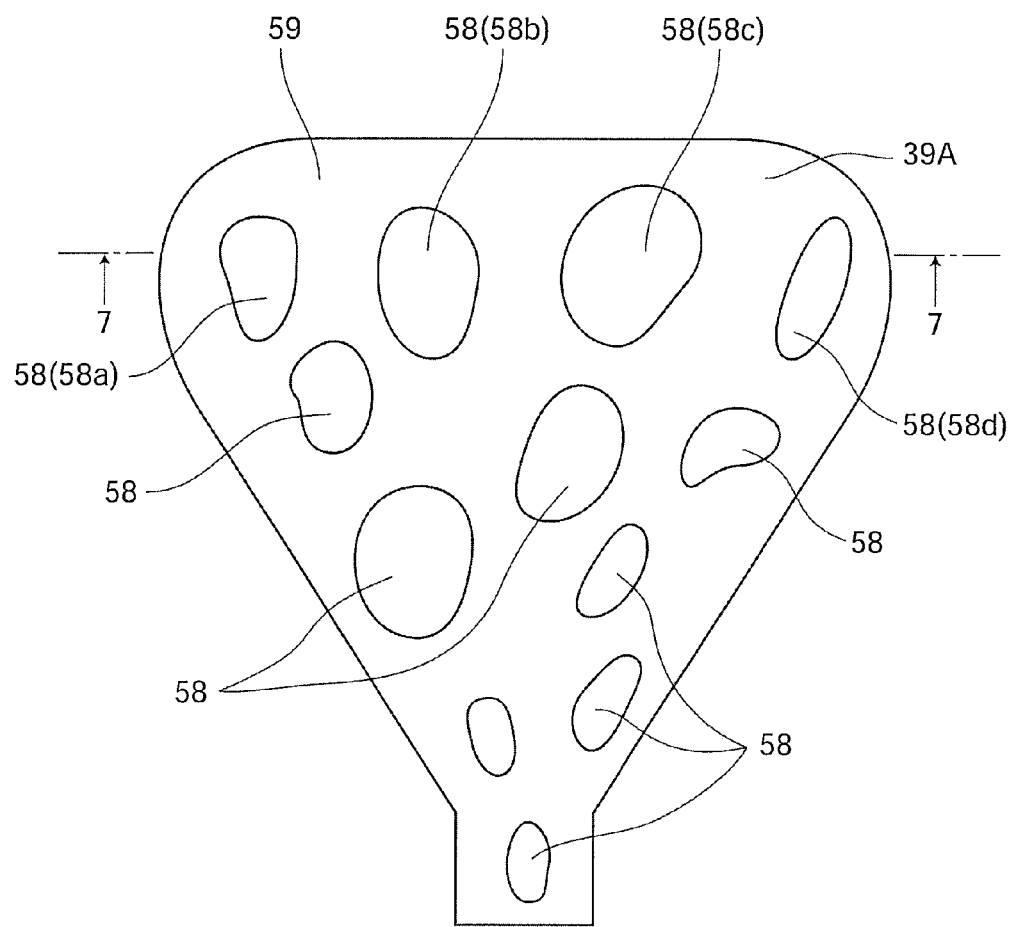
FIG. 6 is a plan view of a second thin-film metal layer.
Figure 7:
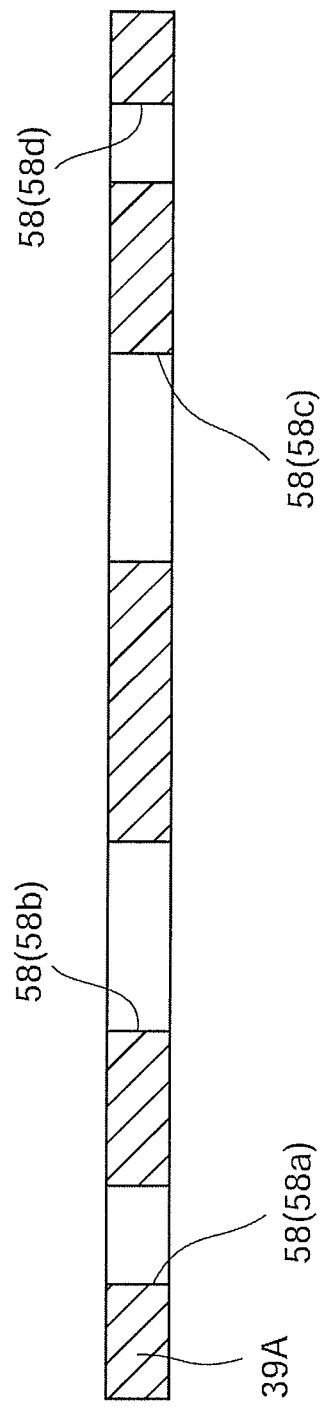
FIG. 7 is a sectional view taken along the line 7-7 in FIG. 6.
Figure 8:
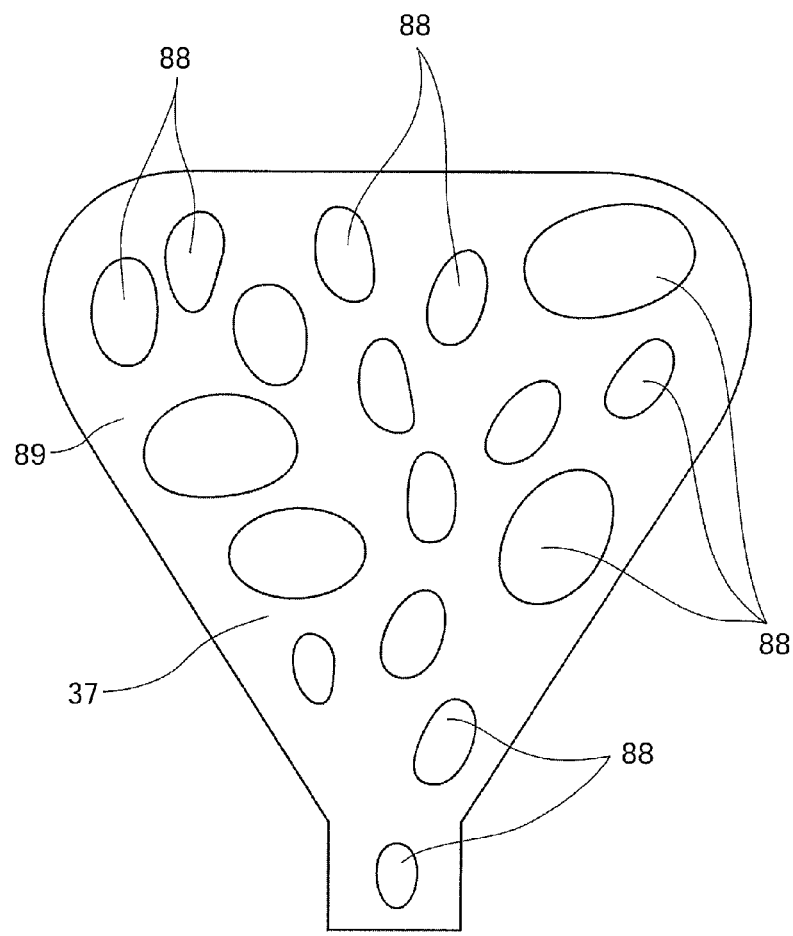
FIG. 8 is a plan view of the closely adhesive layer.
Figure 9:
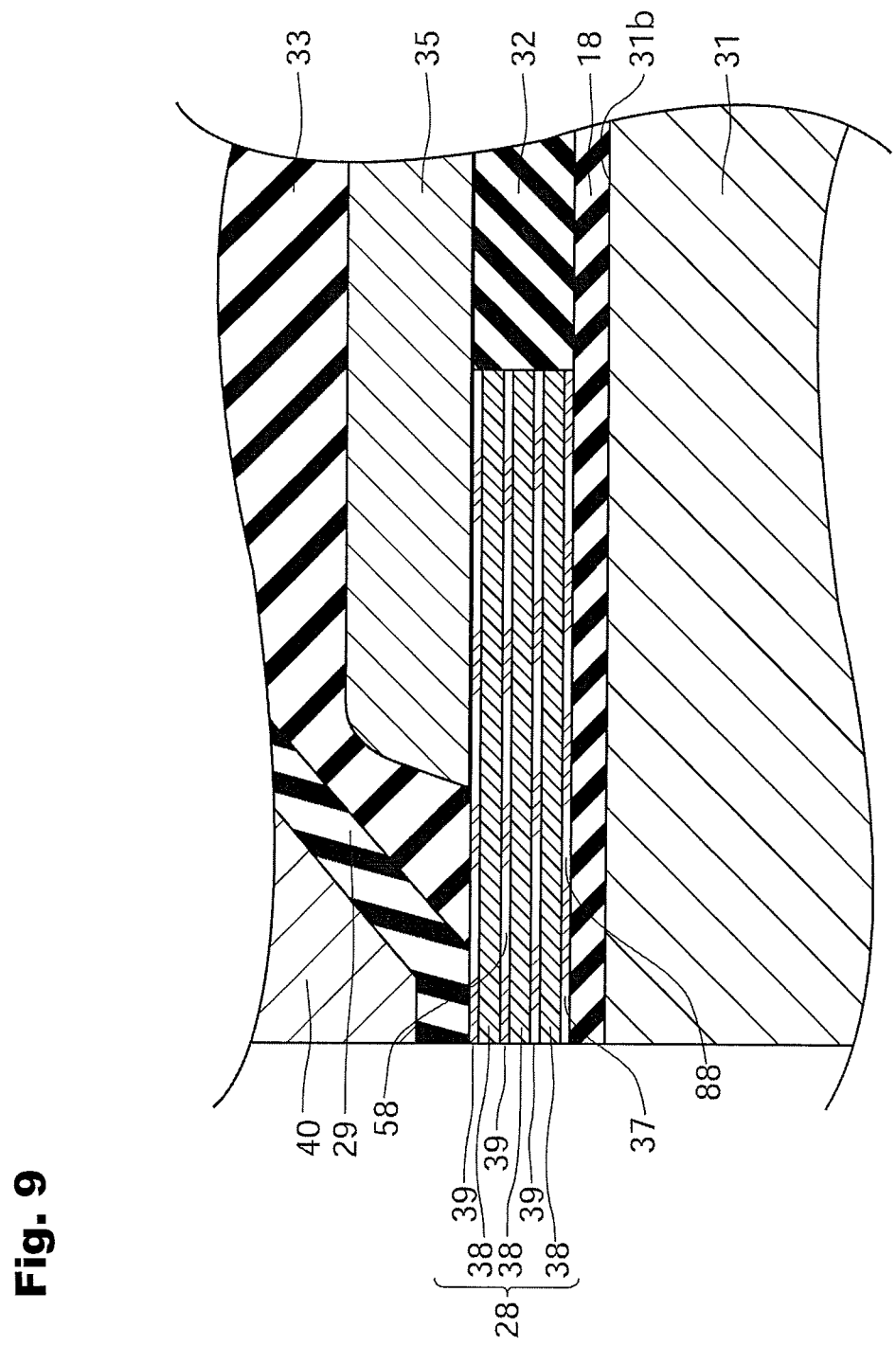
FIG. 9 is a sectional view similar to FIG. 1, illustrating principal part of the thermally assisted magnetic head in accordance with an embodiment of the present invention.
Figure 11:
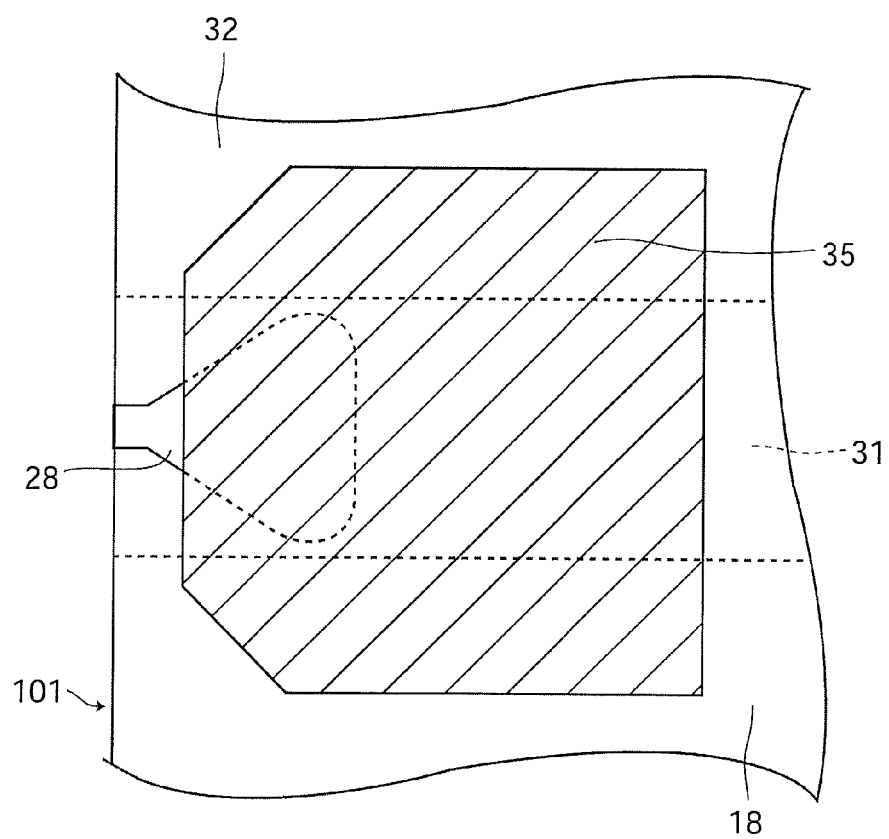
FIG. 11 is a plan view illustrating principal parts of the near-field light generating layer, the interposed layer, the optical waveguide and a heat sink.

Here, FIG. 1 is a sectional view of a thermally assisted magnetic head 100 in accordance with an embodiment of the present invention taken along the line 1-1 of FIG. 2, which is a direction intersecting with an air bearing surface (which will hereinafter be referred also to as "ABS"), while FIG. 2 is a front view illustrating an ABS 101 of the thermally assisted magnetic head 100. FIG. 3 is a perspective view illustrating principal parts of a near-field light generating layer 28, a closely adhesive layer 37, an interposed layer 18 and an optical waveguide 31. FIG. 4 is a sectional view of the near-field light generating layer 28 and closely adhesive layer 37 taken along the line 4-4 in FIG. 3, FIG. 5 is an exploded perspective view of the near-field light generating layer 28 and the closely adhesive layer 37, which are partially omitted. Further, FIG. 6 is a plan view of a second thin-film metal layer 39A, FIG. 7 is a sectional view taken along the line 7-7 in FIG. 6. FIG. 8 is a plan view of the closely adhesive layer 37. FIG. 9 is a sectional view similar to FIG. 1, illustrating principal part of the thermally assisted magnetic head 100. FIG. 10 is a front view similar to FIG. 2, illustrating principal part of the thermally assisted magnetic head 100. FIG. 11 is a plan view illustrating principal parts of the near-field light generating layer 28, the interposed layer 18, the optical waveguide 31 and a heat sink 35.

In the thermally assisted magnetic head 100, the near-field light generating layer 28 has, as illustrated in FIG. 3 to FIG. 5, a laminated structure in which first thin-film metal layers 38 and second thin-film metal layers 39 are alternately laminated. Further, the second thin-film metal layer 39 is formed using a second metal such as Zr, Ru, Ta or the like larger in hardness than the first thin-film metal layer 38, so that the near-field light generating layer 28 is higher in mechanical strength and less likely to be deformed than a near-field light generating layer (not illustrated) formed using only a first metal such as Au, Ag or the like. In addition, defect parts 58 are formed in the second thin-film metal layer 39 and a flat layer part 59 surrounds the defect parts 58, whereby the volume of the second metal contained in the near-field light generating layer 28 is reduced, resulting in a reduction of the volume of heat generation in the second thin-film metal layers 39. Therefore, projection, melting, deformation and recess of the near-field light generating layer 28 is reduced, and deformation, melting, and chipping of a main magnetic pole layer 40 arranged close thereto is also reduced.

Note that the right and left direction in FIG. 2 is the track width direction, the upper direction is the moving direction of a magnetic recording medium, and the direction perpendicular to the paper surface is the direction perpendicular to the surface of the magnetic recording medium.

Thermally assisted magnetic head 100 comprises a substrate 1, reproducing head and recording head laminated on the substrate 1, while having the ABS 101 as a medium-opposing surface opposing a magnetic recording medium, as illustrated in FIG. 1.

The following will explain structures of main parts of the thermally assisted magnetic head 100, while structures of parts other than the main parts will later be explained in manufacturing processes.

The reproducing head has an MR device 5, arranged near the ABS 101, for detecting a magnetic signal. The reproducing head comprises a lower shield layer 3, a lower shield gap film 4, an upper shield gap film 6 and an upper shield layer 7.

An insulating layer 2 is further formed on the substrate 1, and the lower shield layer 3 made of a magnetic material is formed on the insulating layer 2. The lower shield gap film 4 as an insulating film is further formed on the lower shield layer 3, and the upper shield gap film 6 shielding the MR device 5 is formed on the lower shield gap film 4. The upper shield layer 7 made of a magnetic material is formed on the upper shield gap film 6, and an insulating layer 8 is formed on the upper shield layer 7.

The MR device 5 is constituted by a magnetosensitive film exhibiting a magnetoresistive effect, such as AMR (anisotropic magnetoresistive), GMR (giant magnetoresistive), and TMR (tunneling magnetoresistive) devices.

The GMR device may be of a CIP (Current In Plane) type or a CPP (Current Perpendicular to Plane) type. In the CIP type, current for detecting a magnetic signal flows in a direction almost parallel to planes of the layers constituting the GMR device. In the CPP type, current for detecting a magnetic signal flows in a direction almost perpendicular to planes of the layers constituting the GMR device.

Next, the recording head will be explained. The recording head has a lower thin-film coil 11, a shield magnetic pole layer 20, the interposed layer 18, the near-field light generating layer 28, the optical waveguide 31, the closely adhesive layer 37, the main magnetic pole layer 40, a yoke magnetic pole layer 41, a linking magnetic pole layer 42 and an upper thin-film coil 51, and has a structure in which they are stacked on the substrate 1.

The lower thin-film coil 11 has three turn parts. The respective turn parts are insulated from each other by a photoresist 15. The lower thin-film coil 11 is wound like a flat spiral about the linking magnetic pole layer 42 of the shield magnetic pole layer 20.

The lower thin-film coil 11 is connected to the upper thin-film coil 51. The upper thin-film coil 51 has also three turn parts. The upper thin-film coil 51 is wound like a flat spiral about the yoke magnetic pole layer 41.

Further, a current modulated according to data to be recorded on the magnetic recording medium flows through the lower thin-film coil 11 and upper thin-film coil 51, the current causes the lower thin-film coil 11 and upper thin-film coil 51 to generate a recording magnetic field.

The shield magnetic pole layer 20 has a shield layer 21, a connecting magnetic pole layer 22 and a linking magnetic pole layer 23.

The shield layer 21 has an end face arranged within the ABS 101. The shield layer 21 is junctioned to the connecting magnetic pole layer 22 on a side closer to the ABS 101 than is the lower thin-film coil 11.

The connecting magnetic pole layer 22 has an end face arranged within the ABS 101 and has a part that is more distant from the ABS 101 than is the end face being embedded in the insulating layer 8. Further, to the connecting magnetic pole layer 22, the shield layer 21 is junctioned on the side closer to the ABS 101 than is the lower thin-film coil 11, and the linking magnetic pole layer 23 is junctioned at a position more distant from the ABS 101 than is the three turn parts of the lower thin-film coil 11.

The linking magnetic pole layer 23 is arranged at a position more distant from the ABS 101 than is the three turn parts of the lower thin-film coil 11, and is junctioned to the connecting magnetic pole layer 22.

The shield magnetic pole layer 20 is provided to return a magnetic flux to the main magnetic pole layer 40. When a magnetic flux generated by the recording magnetic field is emitted from a later-described magnetic pole end face 40a of the main magnetic pole layer 40 to the magnetic recording medium, the magnetic flux flows back to the shield magnetic pole layer 20 via the magnetic recording medium (a not-depicted soft magnetic layer in detail). This magnetic flux passes through the linking magnetic pole layer 23 and reaches the main magnetic pole layer 40.

The interposed layer 18 is in direct contact with an upper end face 31b of the optical waveguide 31. The interposed layer 18 is formed using a dielectric substance having a lower refractive index than that of the optical waveguide 31, and for example, using alumina ($Al_2O_3$). The interposed layer 18 has a thickness of, for example, about 10 nm to about 70 nm, which is much smaller than those of the main magnetic pole layer 40 and the optical waveguide 31, and is thus referred also to as a very-thin interposed layer. Further, the near-field light generating layer 28 is formed on the interposed layer 18 via the closely adhesive layer 37.

The near-field light generating layer 28 has, as illustrated in FIG. 3 to FIG. 10, a first thin-film metal layers 38 and a second thin-film metal layers 39, and has a laminated structure which the first thin-film metal layers 38 and the second thin-film metal layers 39 are laminated alternatively. Further, the near-field light generating layer 28 has a generating end part 28a which generates a near-field light. The generating end part 28a is arranged within the ABS 101. The generating end part 28a generates a near-field light for heating the magnetic recording medium.

The near-field light generating layer 28 has three first thin-film metal layers 38A, 38B, 38C as the first thin-film metal layers 38 and three second thin-film metal layers 39A, 39B, 39C as the second thin-film metal layers 39. The second thin-film metal layer 39A is laminated between the first thin-film metal layers 38A, 38B, and the second thin-film metal layer 39B is laminated between the first thin-film metal layers 38B, 38C. Further, in the near-field light generating layer 28, the second thin-film metal layer 39C is laminated on the outside most distant from the optical waveguide 31.

Every one of the first thin-film metal layers 38A, 38B, 38C is formed in a thin-film form along a direction intersecting the ABS 101 (a direction perpendicularly intersecting the ABS 101), and formed equal in shape and thickness. Every one of the second thin-film metal layers 39A, 39B, 39C is also formed in a thin-film form along the direction intersecting the ABS 101 and formed equal in shape and thickness.

The first thin-film metal layers 38A, 38B, 38C are formed using the first metal. The first metal here is a metal having a low resistivity and a high conductivity and can be, for example, any one of Au, Ag, Al, Cu.

The second thin-film metal layers 39A, 39B, 39C are formed using the second metal. The second metal is a metal having a hardness (Vickers hardness is assumed in this embodiment but another index may be used) higher than that of the first metal and can be, for example, any one of Ru, Zr, ZrN, Ta, Mo, Pt, Cr, Ni, Fe, Pd, Ti, NiCr, TiW, TiN, Hf. The second metal is higher in mechanical strength than the first metal. Note that when the first metal is a metal other than Cu, Cu can be used as the second metal.

Further, the thickness of the first thin-film metal layer 38A, 38B, 38C is, for example, about 5 nm to about 20 nm, whereas the thickness of the second thin-film metal layer 39A, 39B, 39C is, for example, about 0.3 nm to about 5 nm, preferably, about 0.2 nm to about 0.6 nm. Therefore, the second thin-film metal layers 39A, 39B, 39C are formed to be smaller in thickness than the first thin-film metal layers 38A, 38B, 38C.

Further, in each of the second thin-film metal layers 39A, 39B, 39C, a plurality (about 10 to 20 in FIG. 3) of defect parts 58 are formed to be scattered not in contact with one another. Each of the defect parts 58 is a part that is smaller in thickness than the other part or is a hole part. The thickness of each defect part 58 is about 0 nm to about 0.2 nm.

In every one of the second thin-film metal layers 39A, 39B, 39C, the flat layer part 59 surrounds almost all of the plurality of defect parts 58. The flat layer part 59 is a part other than the defect parts 58 in each of the second thin-film metal layers 39A, 39B, 39C and is a flat part having a fixed thickness. The flat layer part 59 continues without a break due to the defect parts 58, so that each of the second thin-film metal layers 39A, 39B, 39C is thus formed as one layer.

The second thin-film metal layer 39A, 39B, 39C has a structure like a net-like pattern because of the plurality of defect parts 58 scattered as illustrated in FIG. 3. The structure like the net-like pattern is called a net-like structure in this embodiment.

Note that since a defect part 58 is arranged at a portion of the peripheral part of the second thin-film metal layer 39A, 39B, 39C in FIG. 3, the defect part 58 is far from being surrounded by the flat layer part 59. However, the whole peripheries of many other defect parts 58 are surrounded by the flat layer part 59.

In FIG. 3, the plurality of defect parts 58 in the second thin-film metal layer 39C are illustrated. The defect parts 58 are scattered in the second thin-film metal layer 39C and form respective hole parts having no thickness (namely, penetrating from the front side to the rear side). Therefore, the front surface of the first thin-film metal layer 38C arranged under the defect parts 58 is exposed inside each of the defect parts 58 (dots in FIG. 3 illustrate the front surface of the first thin-film metal layers 38C).

Every one of the defect parts 58 illustrated in FIG. 3, FIG. 5 and the like is formed in an approximately oval shape. The defect parts 58 are non-uniform in size and shape and are not unified. An arrangement spot has no regularity and is thus irregular.

In the second thin-film metal layers 39A, 39B, 39C, the defect parts 58 are able to be unified in size, shape, arrangement spot, unlike the illustrated case, but may not be unified as in the illustrated case. However, in each of the second thin-film metal layers 39A, 39B, 39C, it is preferable to arrange the defect parts 58 in a manner to evenly disperse them as much as possible without unevenly distributing them at a specific spot, namely, to scatter the plurality of the defect parts 58 as illustrated in FIG. 3.

The near-field light generating layer 28 closely adheres to the interposed layer 18 with the closely adhesive layer 37. The closely adhesive layer 37 is formed to make the near-field light generating layer 28 closely adhere to the interposed layer 18 so as to prevent the near-field light generating layer 28 from exfoliating from the interposed layer 18.

The closely adhesive layer 37 has an outer shape in common with the first thin-film metal layer 38A, the second thin-film metal layer 39A and the like, and formed in a thin-film form having a thickness of about 0.3 nm to about 1 nm. The closely adhesive layer 37 is formed using, for example, a third metal such as Zr, Ti, Cr, Ta, W. The third metal is known as a closely adhesive material with a property of making the first metal such as Au, Ag or the like closely adhere to alumina ($Al_2O_3$).

As illustrated in FIG. 5, a plurality of closely adhesive layer defect parts 88 similar to the defect parts 58 are formed in the closely adhesive layer 37. The closely adhesive layer defect parts 88 are formed to be scattered not in contact with one another. Also in the closely adhesive layer 37, a closely adhesive layer flat layer part 89 surrounds almost all of the plurality of closely adhesive layer defect parts 88. The closely adhesive layer flat layer part 89 is a part other than the closely adhesive layer defect parts 88 of the closely adhesive layer 37 and is a flat part having a fixed thickness. The closely adhesive layer flat layer part 89 continues without a break due to the closely adhesive layer defect parts 88, so that the closely adhesive layer 37 is formed as one layer. The closely adhesive layer 37 also has a net-like structure because of the plurality of scattered closely adhesive layer defect parts 88.

Note that the closely adhesive layer defect parts 88 can be made similar to the defect parts 58 in size, shape, arrangement spot but may be made different therefrom.

On the other hand, a surrounding dielectric substance layer 32 is filled in the surrounding space of the near-field light generating layer 28, as illustrated in FIG. 1, FIG. 2, FIG. 9. The surrounding dielectric substance layer 32 is formed using a dielectric substance such as alumina or the like.

Further, the near-field light generating layer 28 has a part whose width along the ABS 101 (lateral width) is fixed, and a part whose width gradually increases as it is distanced more from the ABS 101 (wider part). Further, a heat sink 35 is connected to the wider part. The heat sink 35 is formed of a material having a high thermal conductivity, such as Au, Ag, Al, Cu or the like.

The optical waveguide 31 has, as illustrated in FIG. 3, the waveguide end face 31*a* arranged within the ABS 101. Further, the optical waveguide 31 extends from the ABS 101 in a direction perpendicular to the ABS 101 (referred also to as a depth direction), and the optical waveguide 31 is formed to approach from the rear side to the ABS 101 passing through (penetrating) the linking magnetic pole layer 42. The optical waveguide 31 has the upper end face 31*b* on the main magnetic pole layer 40 side.

Figure 41A:
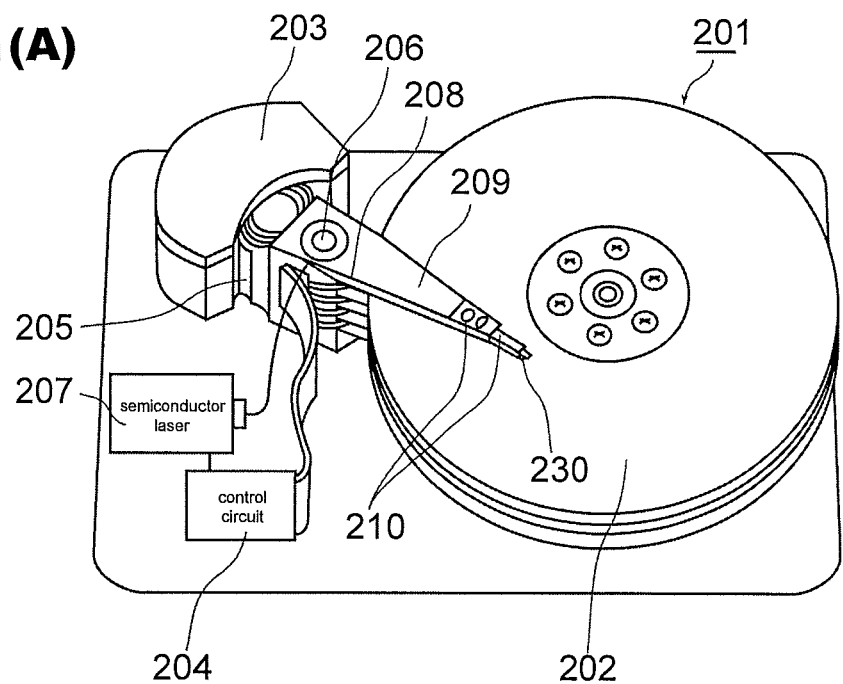
FIG. 41 (a) is a perspective view illustrating a hard disk drive equipped with a thermally assisted magnetic head in FIG. 1, FIG. 41 (b) is a perspective view illustrating a rear side of HGA.
Figure 41B:
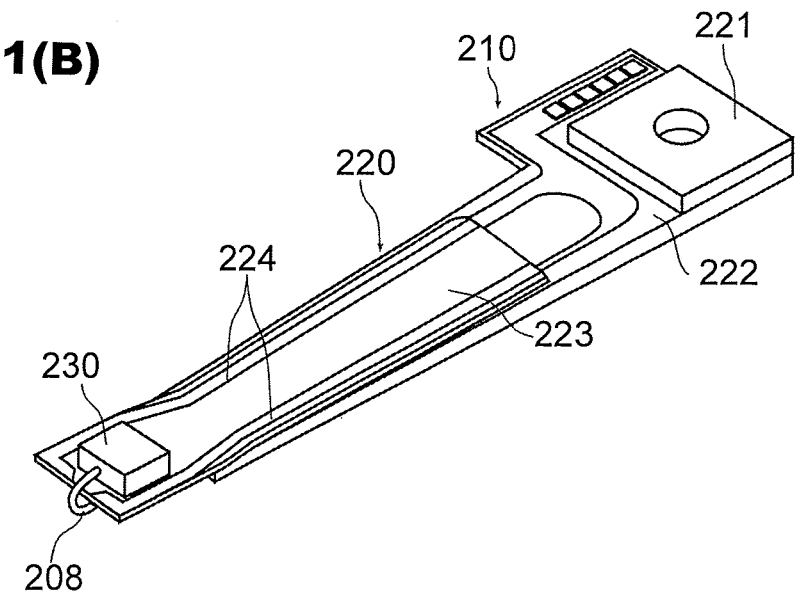

The optical waveguide 31 is formed using a dielectric substance which transmits laser light, such as $Ta_2O_5$ or the like and has a thickness of about 0.4 μm to about 1.5 μm. An optical fiber 208 is connected to the optical waveguide 31, as illustrated in FIG. 41. Laser light generated by a semiconductor laser 207 are inputted to the optical waveguide 31 via the optical fiber 208. Note that the semiconductor laser 207 and the optical fiber 208 are illustrated in FIG. 41 (both of them will be described later in detail).

Next, the main magnetic pole layer 40 will be explained with reference to FIG. 1 and FIG. 2. The main magnetic pole layer 40 is arranged on an upper side of the near-field light generating layer 28 (side distant from the substrate 1). The main magnetic pole layer 40 has a magnetic pole end face 40*a* arranged within the ABS 101. Further, the main magnetic pole layer 40 opposes to the generating end part 28*a* via a dielectric substance layer 29 within the ABS 101 and is formed to decrease its height along the ABS 101, as it is distanced more from the ABS 101. The upper end part of the main magnetic pole layer 40 is a flat surface along the intersecting direction, the yoke magnetic pole layer 41 is connected to the flat surface.

Further, the main magnetic pole layer 40 have a symmetrical structure in width direction formed to be bilaterally symmetrical about part thereof opposed to the generating end part 28*a*.

The yoke magnetic pole layer 41 is arranged in a position recedes from the ABS 101. The yoke magnetic pole layer 41 is junctioned to a flat upper side part of the main magnetic pole layer 40. Further, the yoke magnetic pole layer 41 extends along the depth direction, and is connected to the linking magnetic pole layer 42 straddling the upper thin-film coil 51 and the insulating layer 52. The upper surface of yoke magnetic pole layer 41 (surface of the side distant from the substrate 1) is partially formed flat.

The linking magnetic pole layer 42 is connected to the yoke magnetic pole layer 41 at a position distant from the ABS 101 than are the three turn parts of the upper thin-film coil 51. Further, the linking magnetic pole layer 42 is arranged in a manner to hold the optical waveguide 31 and the interposed layer 18 from both right and left sides.

The linking magnetic pole layer 42 is a magnetic pole layer magnetically links the shield magnetic pole layer 20 to the yoke magnetic pole layer 41. The linking magnetic pole layer 42 has a role of returning, to the main magnetic pole layer 40, the magnetic flux flown back to the shield magnetic pole layer 20.

(Operation Contents of Thermally Assisted Magnetic Head)

Subsequently, the magnetic recording operation of the thermally assisted magnetic head having the above structure will be explained as follows.

When a current modulated according to data to be recorded on the magnetic recording medium is caused to flow through the lower thin-film coil 11 and upper thin-film coil 51, the current generates a recording magnetic field. The recording magnetic field passes through the main magnetic pole layer 40, and a magnetic flux caused by the recording magnetic field is emitted from the magnetic pole end face 40*a* to the magnetic recording medium. With this magnetic flux, the data is recorded on the magnetic recording medium.

On the other hand, when the semiconductor laser 207 generates laser light, the laser light are transmitted to the optical waveguide 31 via the optical fiber 208. The laser light move through the optical waveguide 31 to the ABS 101. Since the interposed layer 18 is formed so as to cover with the outer face of the optical waveguide 31, and the near-field light generating layer 28 is formed outside of the interposed layer 18, the laser light is applied to the near-field light generating layer 28 via the interposed layer 18.

Further, the interposed layer 18 having a lower refractive index than that of optical waveguide 31 is in contact with the optical waveguide 31. Therefore, when laser light enter the interposed layer 18 having lower refractive index from the optical waveguide 31 having higher refractive index and are totally reflected, evanescent light seeps near the surface of the interposed layer 18 having a lower refractive index. The use of the evanescent light makes it possible to match the phase speed thereof with the phase speed of surface plasmons and excite surface plasmons.

The surface plasmons propagate to the generating end part 28*a* of the near-field light generating layer 28. The surface plasmons are concentrated on the generating end part 28*a*. Then, a near-field light having a very high electric field intensity is generated near the generating end part 28*a*.

The near-field light is applied from the generating end part 28*a* to the magnetic recording medium and reaches the surface of the magnetic recording medium. Then, a limited extremely small region in the magnetic recording layer of the magnetic recording medium is intensively heated by the near-field light. In the magnetic recording layer, the coercive force reduces to an extent at which data is able to be recorded by the magnetic flux caused by the recording magnetic field.

In the thermally assisted magnetic head 100, the coercive force is able to be reduced in the above-descried manner, so that data can be recorded also on a magnetic recording medium having a high coercive force for high-density recording.

(Operation and Effect of the Thermally Assisted Magnetic Head)

The near-field light generating layer 28 generates the near-field light when the thermally assisted magnetic head 100 performs the above-described magnetic recording operation.

Now, a case, where a near-field light generating layer is formed using only Au or Ag as in the conventional thermally assisted magnetic head, is considered. In the near-field light generating layer, a temperature increase occurs accompanying generation of near-field light, thus causing self expansion.

Since Au or Ag is particularly higher in coefficient of thermal expansion than other metals, the near-field light generating layer largely expands accompanying the generation of near-field light to project from the ABS when the near-field light generating layer is formed using only Au or Ag. Thus, in the conventional thermally assisted magnetic head, collision with the magnetic recording medium is likely to occur and the hard disk drive is likely to fail. Further, when temperature decreases, the near-field light generating layer shrinks and a front end surface of the near-field light generating layer sometimes recedes from the ABS. In addition, if the heat generated by the near-field light generating layer is conducted to the main magnetic pole layer, the heat may deform or chip a portion on the ABS side of the main magnetic pole layer.

On the other hand, since Au or Ag is not so high in melting point as compared with other metals, the near-field light generating layer highly possibly melts or deforms accompanying an increase in temperature.

In the thermally assisted magnetic head 100 according to the embodiment of the present invention, however, the near-field light generating layer 28 has the above-described laminated structure and the defect parts 58 and the flat layer part 59 are formed in the second thin-film metal layer 39, so that the operation and effect described below can be provided to solve the above problems.

First, in the near-field light generating layer 28, the first thin-film metal layer 38 is formed using the first metal such as Au, Ag, Al, Cu or the like as in the conventional near-field light generating layer, whereas the second thin-film metal layer 39 is formed using the second metal. The second metal is composed of Ru, Zr, Pt, Pd, ZrN or the like which is higher in hardness (Vickers hardness) and mechanical strength than the first metal, and so the second metal is higher in stiffness.

For this reason, the second thin-film metal layer 39 is less likely to be deformed than the first thin-film metal layer 38. The second thin-film metal layer 39 is included in the near-field light generating layer 28, so that the near-field light generating layer 28 increases in mechanical strength as a whole.

Furthermore, the second thin-film metal layers 39 and the first thin-film metal layers 38 are alternately laminated and are in direct contact with each other, so that even if the first thin-film metal layer 38 tries to deform, the second thin-film metal layer 39 displays an operation of stopping the deformation. This makes it possible to suppress as much as possible the deformation of the near-field light generating layer 28 due to its own heat generation and to prevent as much as possible the projection thereof from the ABS 101.

Further, even if the second thin-film metal layer 39 is included in the near-field light generating layer 28, the first thin-film metal layer 38 high in electric conductivity is included in the near-field light generating layer 28 and can thus make the near-field light generating layer 28 efficiently generate near-field light.

The second metal (for example, Zr), however, is higher in hardness than the first metal (for example, Au) but lower in thermal conductivity than the first metal (for example, Au). Therefore, the second metal (for example, Zr) is less likely to conduct heat to the outside than the first metal. Accordingly, the second thin-film metal layer 39 is more likely to accumulate heat inside thereof than the first thin-film metal layer 38.

When the second thin-film metal layer 39 is included in part of the near-field light generating layer 28, the near-field light generating layer 28 will generate more heat, as a whole, than the conventional near-field light generating layer including no second metal.

When the near-field light generating layer 28 generates more heat, surface plasmons excited thereby will decrease. To compensate for the decrease, the output of the semiconductor laser 207 needs to be increased. Then, laser light with higher energy is guided into the near-field light generating layer 28, resulting in an increase in heat generation by the near-field light generating layer 28.

To improve such a situation, in the thermally assisted magnetic head 100 according to the embodiment of the present invention, the defect parts 58 and the flat layer part 59 are formed in the second thin-film metal layer 39 constituting the near-field light generating layer 28.

As has been described above, the defect parts 58 are parts that are smaller in thickness than the other part or are hole parts. Therefore, the defect parts 58 are formed in the second thin-film metal layer 39, whereby the volume of the second metal contained in the near-field light generating layer 28 is smaller than that in the case of not including the defect parts 58. When the second metal lower in thermal conductivity than the first metal is decreased in volume, the heat remaining in the second thin-film metal layer 39 is accordingly decreased, whereby the volume of heat generation in the near-field light generating layer 28 is able to be reduced as a whole.

Accordingly, the near-field light generating layer 28 can be prevented from melting, deforming, and projecting from the ABS 101 due to its own heat generation.

This eliminates the situation in which the generating end part 28a melts and deforms, and therefore the generating end part 28a is able to heat surely the very small recording region of the magnetic recording medium. Therefore a reliability of the thermally assisted magnetic head 100 is able to be increased.

Further, in the thermally assisted magnetic head 100, the main magnetic pole layer 40 is arranged very near the near-field light generating layer 28, and the heat generated at the near-field light generating layer 28 unlikely to reach the main magnetic pole layer 40. Therefore, chipping and deformation of the main magnetic pole layer 40 are also able to be effectively prevented.

On the other hand, when the defect parts 58 are not formed in the second thin-film metal layer 39, the second thin-film metal layer 39 comes to be in contact with the entire front surface and rear surface of the first thin-film metal layer 38, thereby possibly decreasing the generation efficiency of the near-field light.

However, since the defect parts 58 are formed in the second thin-film metal layer 39, the portion of the first thin-film metal layer 38 with which the second thin-film metal layer 39 comes into contact is smaller than that in the case where the defect parts 58 are not formed. Accordingly, the near-field light generating layer 28 is configured such that it does not decrease so much in generation efficiency of the near-field light though it includes the second thin-film metal layer 39.

Further, the thermally assisted magnetic head 100 is able to prevent a situation that the near-field light generating layer 28 projects from the ABS 101, and thus is able to prevent failure of the hard disk drive.

On the other hand, in the second thin-film metal layer 39, the peripheries of the plurality of defect parts 58 are surrounded by the flat layer part 59. Therefore, in the near-field light generating layer 28, the volume of the second metal is reduced while the mechanical strength of the second thin-film metal layer 39 is substantially maintained as a whole.

Especially, the near-field light generating layer 28 has the net-like structure in which the flat layer part 59 continues without a break and the defect parts 58 are arranged in balanced manner as a whole in the second thin-film metal layer 39. Therefore, the second thin-film metal layer 39 is one thin film though the volume of the second metal is small. Accordingly, the second thin-film metal layer 39 can maintain its outer shape as a whole even if external force is applied thereto from any direction.

If the flat layer part 59 is broken by the defect parts 58, for example, if the flat layer part 59 is divided into two parts by the defect parts 58, the second thin-film metal layer 39 may become difficult to maintain its outer shape depending on the direction in which the external force is applied thereto. Then, the function of stopping the deformation of the first thin-film metal layer 38 by the second thin-film metal layer 39 decreases to make it also difficult to prevent deformation and the like of the near-field light generating layer 28 due to its own heat generation.

Hence, the near-field light generating layer 28 is made such that the second thin-film metal layer 39 is formed in the net-like structure in which the flat layer part 59 continues without a break due to the defect parts 58 so that the second thin-film metal layer 39 can maintain its outer shape as a whole.

In addition, in the near-field light generating layer 28, at least two second thin-film metal layers 39 are laminated and the first thin-film metal layer 38 is laminated between them. Therefore, the near-field light generating layer 28 has a structure in which the first thin-film metal layer 38 which is comparatively soft, is covered from the outside by the second thin-film metal layers 39 which are high in mechanical strength. Accordingly, the mechanical strength of the near-field light generating layer 28 can be made higher as a whole.

Further, the second thin-film metal layer 39 has the net-like structure by the plurality of defect parts 58, and the defect parts 58 are substantially evenly arranged without being unevenly distributed at a portion in the second thin-film metal layer 39. Therefore, there is no part that is relatively low in mechanical strength in second thin-film metal layer 39. Even if the volume of the second metal is reduced, the mechanical strength of the second thin-film metal layer 39 is maintained as a whole.

Furthermore, the near-field light generating layer 28 is formed on the interposed layer 18 via the closely adhesive layer 37 so as to avoid such a situation that the near-field light generating layer 28 exfoliates from them. The closely adhesive layer 37 is formed using the third metal and is formed also with the closely adhesive layer defect parts 88 and the closely adhesive layer flat layer part 89. Therefore, the volume of the closely adhesive layer 37 is also reduced while the mechanical strength is maintained as a whole. Accordingly, since accumulation of heat in the closely adhesive layer 37 is also suppressed, the heat conducted from the closely adhesive layer 37 to the near-field light generating layer 28 is reduced.

Further, since the second thin-film metal layer 39 is formed to be smaller in thickness than the first thin-film metal layer 38, the proportion of the second thin-film metal layer 39 with a lower thermal conductivity in the near-field light generating layer 28 is able to be decreased. This makes it possible to reduce the volume of heat generation in the near-field light generating layer 28 as a whole.

In the near-field light generating layer 28, the second thin-film metal layer 39C is laminated on the outside most distant from the optical waveguide 31. If the second thin-film metal layer 39C is not laminated, the second thin-film metal layer in contact with the outside of the first thin-film metal layer 38C no longer exists, and the function of stopping the deformation of the first thin-film metal layer 38C possibly decreases. However, since the second thin-film metal layer 39C is laminated in the near-field light generating layer 28, there is no such possibility.

(Method of Manufacturing Thermally Assisted Magnetic Head)

Figure 16B:
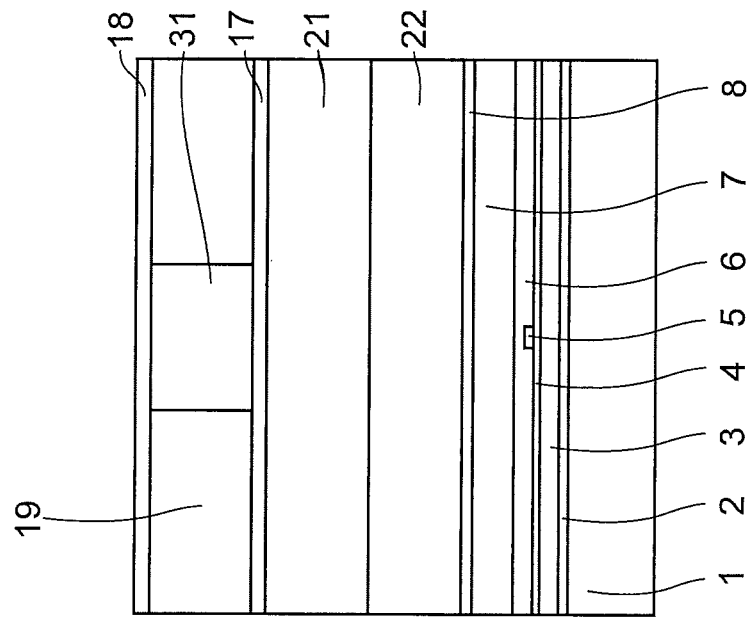
FIG. 16 is a view illustrating a process subsequent to that in FIG. 15, in which (A) is a sectional view corresponding to FIG. 1, (B) is a front view corresponding to FIG. 2.

Next, a method of manufacturing the thermally assisted magnetic head 100 having the structure mentioned above will now be explained with reference to FIG. 12 (A), (B) to FIG. 16 (A), (B) and FIG. 17 to FIG. 26 together with FIG. 1 and FIG. 2 mentioned above.

Figure 17:
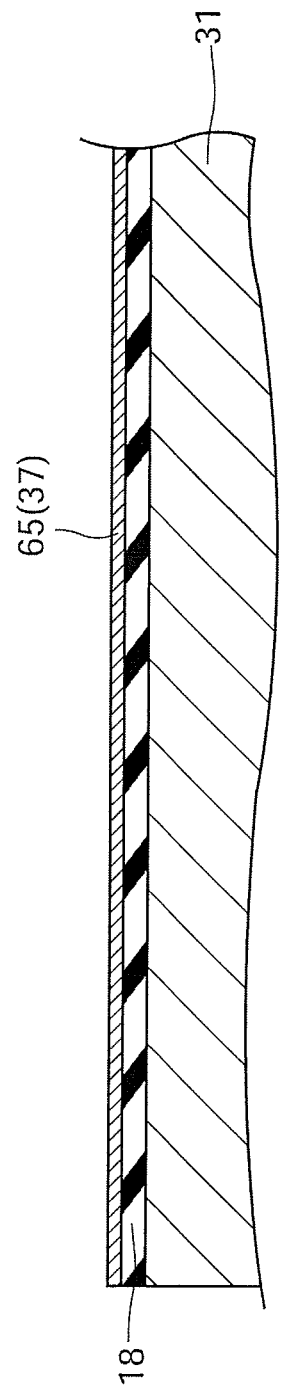
FIG. 17 is a sectional view illustrating a principal part of a process subsequent to that in FIG. 16 (A)
Figure 18:
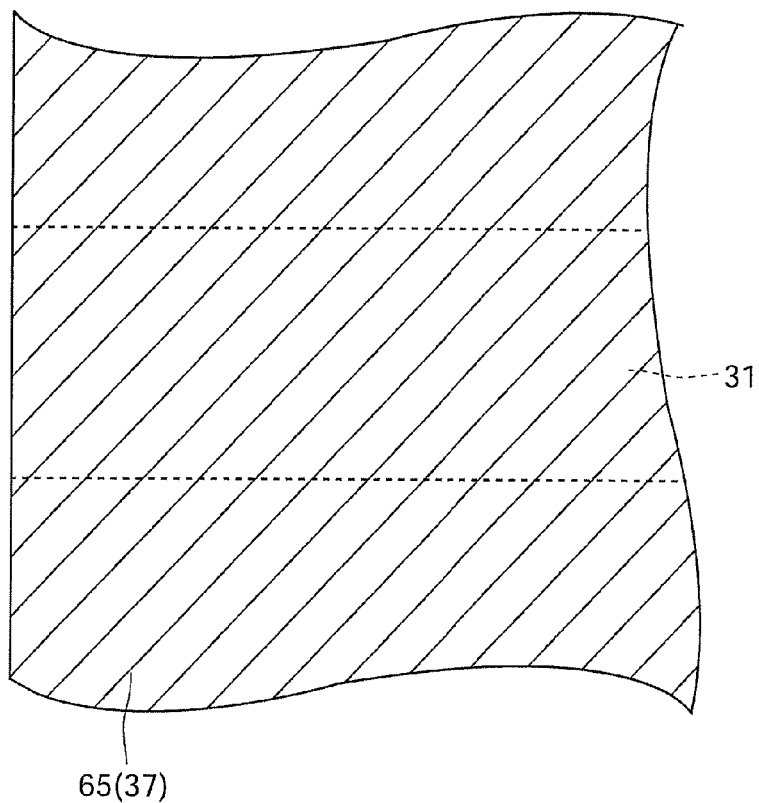
FIG. 18 is a plan view corresponding to FIG. 17.

Here, FIG. 12(A) to FIG. 16(A) are sectional views corresponding to FIG. 1 in the processes of manufacturing the thermally assisted magnetic head 100, and FIG. 12(B) to FIG. 16(B) are front views corresponding to FIG. 2 in the processes of manufacturing the thermally assisted magnetic head 100. In each drawing, the left end face in (A) indicates a position (a planned opposing surface position) which will become the ABS 101 afterward. Further, FIG. 17, 19, 21, 23, 25 are sectional views illustrating principal part in the subsequent processes of FIG. 16 (A) in order. FIG. 18, 20, 22, 24, 26 are plan views corresponding to FIG. 17, 19, 21, 23, 25 respectively.

First, the substrate 1 made of a ceramic material such as aluminum oxide-titanium carbide ($Al_2O_3.TiC$) is prepared. Subsequently, as shown in FIG. 12 (A), (B), the insulating layer 2 made of an insulating material such as alumina ($Al_2O_3$), the lower shield layer 3 made of a magnetic material and the lower shield gap film 4 are successively laminated on the substrate 1.

Next, the upper shield gap film 6 is formed by an insulating material such as to shield the MR device 5. Here, an undepicted lead connected to the MR device 5 is formed, and the MR device 5 and lead are covered with the upper shield gap film 6. Thereafter, using a magnetic material, the upper shield layer 7 is formed on the upper shield gap film 6.

Then, on the upper shield layer 7, the insulating layer 8 is formed using an insulating material such as alumina ($Al_2O_3$) or the like. Thereafter, a portion of the insulating layer 8 which is located on the planned opposing surface position side is removed, and the connecting magnetic pole layer 22 is formed using a magnetic material such as CoNiFe, CoFe, NiFe, CoFeN or the like.

Then, as illustrated in FIG. 13(A), (B), an insulating layer 14 is formed on the whole surface of the laminated body using an insulating material such as alumina ($Al_2O_3$) or the like, and parts of the insulating layer 14, that the shield layer 21 and the linking magnetic pole layer 23 are formed, are removed.

Then, the shield layer 21 and the linking magnetic pole layer 23 are formed at the opened parts of the insulating layer 14 in the surface of the laminated body, for example, by the frame plating method. Next, as illustrated in FIG. 14(A), FIG. 14(B), an insulating layer 16 (having a thickness of about 0.02 μm to 0.3 μm, preferably about 0.1 μm to 0.2 μm) made of alumina ($Al_2O_3$) is formed on the whole surface of the laminated body by CVD (Chemical Vapor Deposition) according to an atomic layer method. The insulating layer 16 is formed so as to cover the shield layer 21 and the linking magnetic pole layer 23.

Then, a conductor layer for forming the lower thin-film coil 11 is formed between the shield layer 21 and the linking magnetic pole layer 23 by the frame plating method. Next, a photoresist layer 91 (having a thickness of about 1.5 μm to 2.5 μm) is formed so as to fill up the interstice part of the conductor layer. Next, an insulating film 26 adapted to cover the surface of the laminated body is formed using alumina ($Al_2O_3$) by a thickness of about 3 μm to 4 μm. Subsequently, the surface of the laminated body is polished by CMP until the shield layer 21 and the linking magnetic pole layer 23 emerge, so as to become flat.

Figures 15A, 15B:
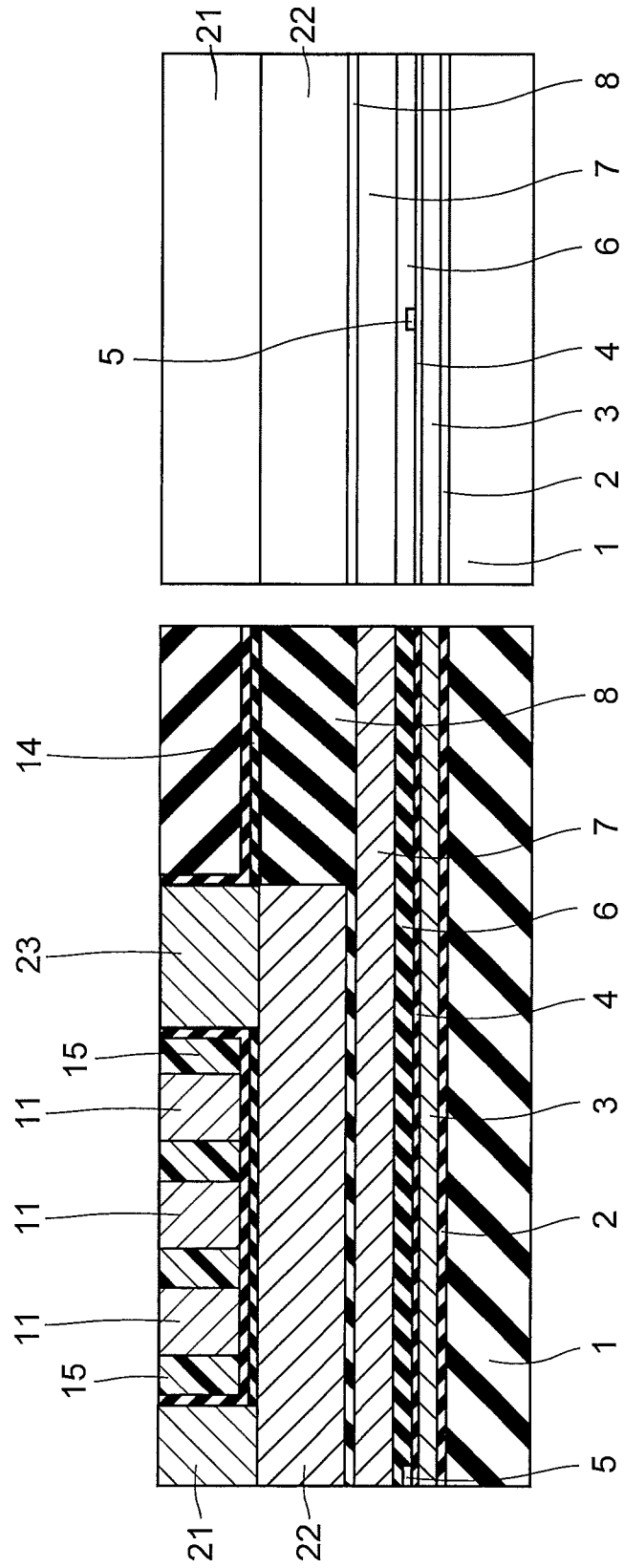
FIG. 15 is a view illustrating a process subsequent to that in FIG. 14, in which (A) is a sectional view corresponding to FIG. 1, (B) is a front view corresponding to FIG. 2.

Then, as illustrated in FIG. 15(A), (B), flattening step of the shield layer 21 and the linking magnetic pole layer 23 together with the conductor layer is performed. By this, the lower thin-film coil 11 and the photoresist 15 are formed.

Figure 16A:
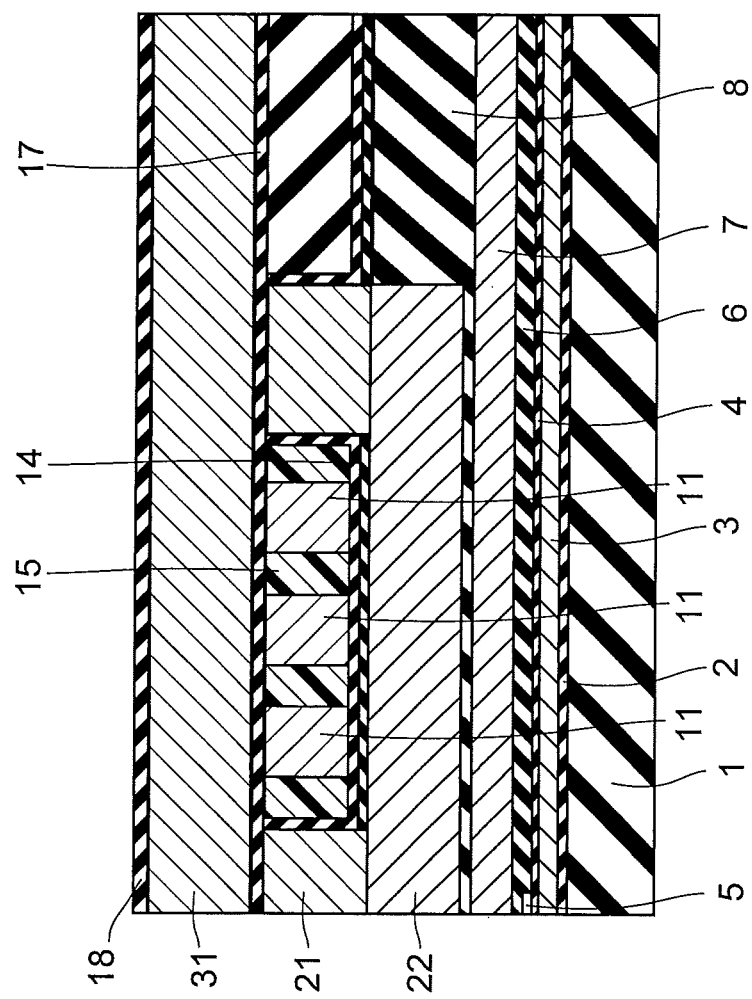

Subsequently, as illustrated in FIG. 16(A), (B), an insulating layer 17 adapted to cover the surface of the laminated body is formed using alumina ($Al_2O_3$). Then, an optical waveguide forming step is performed. In this step, the optical waveguide 31 is formed on the surface of the laminated body, as illustrated in FIG. 1. The optical waveguide 31 is formed using a dielectric substance such as $Ta_2O_5$ or the like transmitting the laser light. The optical waveguide 31 is formed to have a rectangular parallelepiped-shape part on the planned opposing surface position side.

Next, a first dielectric substance layer forming step is performed. In this step, a dielectric substance layer 19 is formed on the surface of the laminated body, using a dielectric substance such as alumina or the like.

Subsequently, a flattening step is performed. In this step, the surface of the laminated body is polished by chemical mechanical polishing (hereinafter, referred to as "CMP") until a surface of the optical waveguide 31 emerges, so as to be made flat.

Next, an interposed layer forming step is performed. In this step, the interposed layer 18 is formed on the whole surface of the laminated body, including the upper end face 31b of the optical waveguide 31, for example, by the atomic layer deposition, using a dielectric substance such as alumina or the like.

Next, a metal thin-film layer forming step and a closely adhesive layer defect step are performed. A metal thin-film layer 65 which becomes the closely adhesive layer afterward is formed in the metal thin-film layer forming step, as illustrated in FIG. 17, 18. This metal thin-film layer 65 is able to be formed with the above-described third metal by sputtering, for example.

Figure 19:
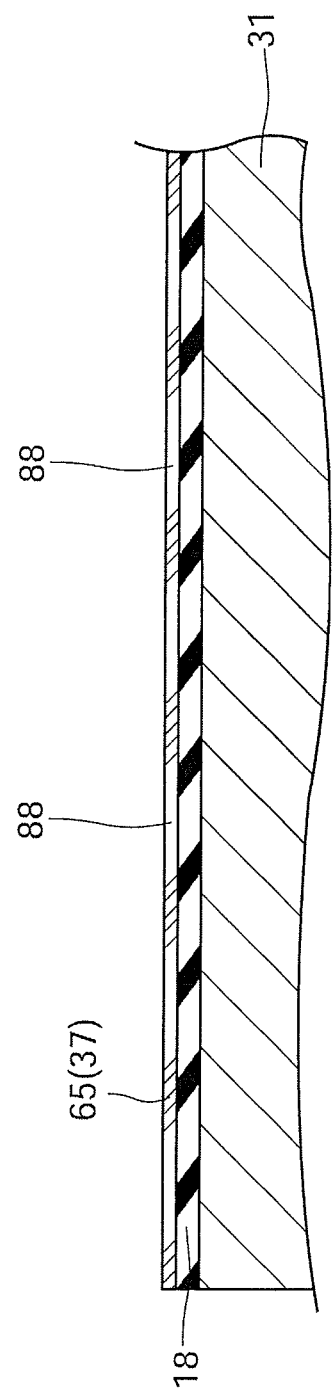
FIG. 19 is a sectional view illustrating a principal part of a process subsequent to that in FIG. 17.
Figure 20:
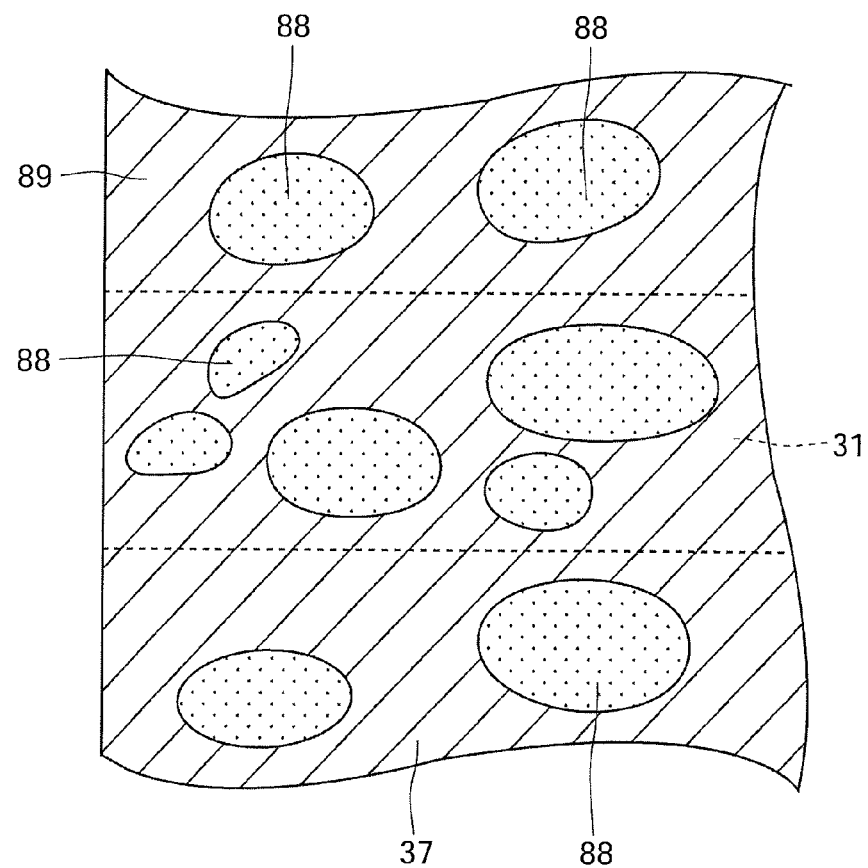
FIG. 20 is a plan view corresponding to FIG. 19.

Subsequent to the metal thin-film layer forming step, the closely adhesive layer defect step is performed. In this step, the plurality of closely adhesive layer defect parts 88 are formed in the metal thin-film layer 65 as illustrated in FIG. 19, FIG. 20. In this case, the closely adhesive layer defect parts 88 are formed such that the closely adhesive layer flat layer part 89 surrounds the plurality of closely adhesive layer defect parts 88 respectively and the closely adhesive layer flat layer part 89 continues without a break. Thus, the closely adhesive layer defect step is performed so that the metal thin-film layer 65 has the above-described net-like structure and will become the closely adhesive layer 37 afterward.

The closely adhesive layer defect step can be performed, for example, by the electron beam irradiation method. The electron beam irradiation method is performed as follows. First, electrons are generated in vacuum and accelerated. Then, the group of the electrons are focused into a thin flux of high energy using a not-illustrated electromagnetic lens and applied to a workpiece. This instantaneously melts the irradiated part and vaporizes and removes it.

The above electron beam irradiation method is used to remove portions of the metal thin-film layer 65 to form the plurality of closely adhesive layer defect parts 88. In this case, the plurality of closely adhesive layer defect parts 88 are formed not to be uneven in size, shape and arrangement spot.

Subsequently, the near-field light generating layer 28 is formed by performing a near-field light generating layer forming step. This near-field light generating layer forming step has a first metal layer forming step, a second metal layer forming step and a metal layer defect step.

Figure 21:
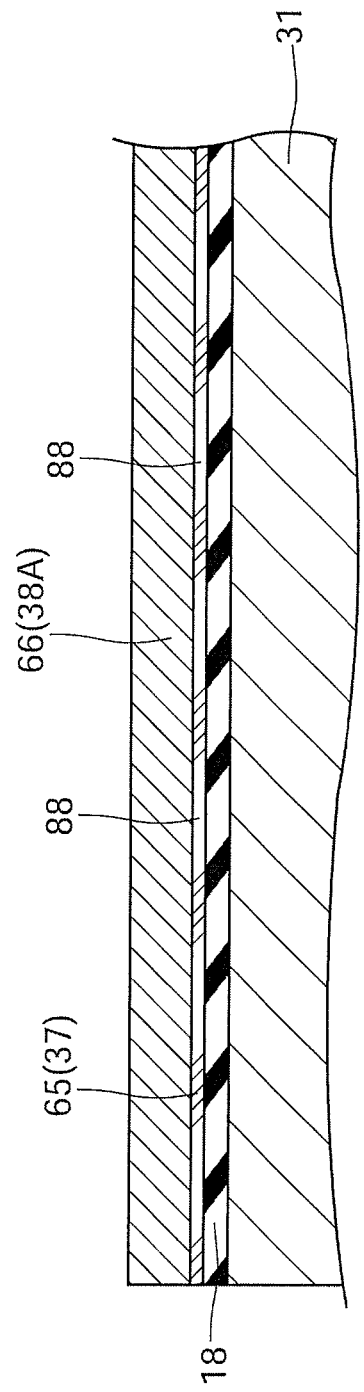
FIG. 21 is a sectional view illustrating a principal part of a process subsequent to that in FIG. 19.
Figure 22:
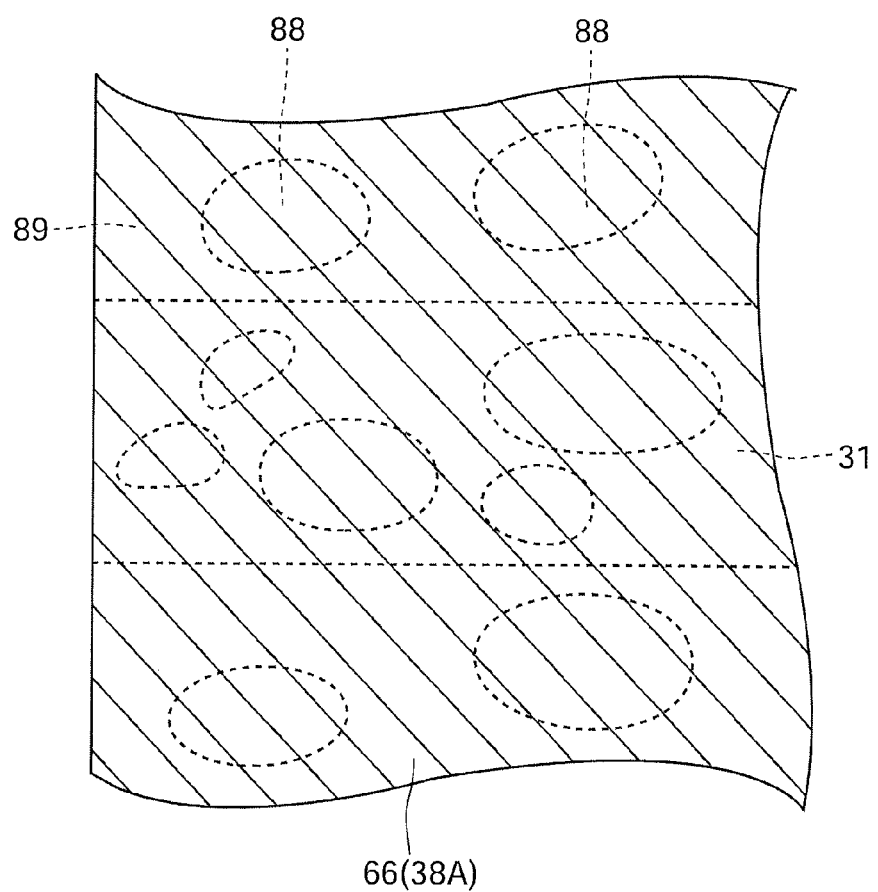
FIG. 22 is a plan view corresponding to FIG. 21.

To begin with, a first metal layer forming step is performed. In this first metal layer forming step, a first metal layer 66 having thin-film like form is formed, as illustrated in FIG. 21, FIG. 22. The first metal layer 66 is formed along the direction intersecting the ABS 101, and it becomes the first thin-film metal layer 38A afterward. The first metal layer 66 is able to be formed with the above-described first metal for example, by sputtering.

Figure 23:
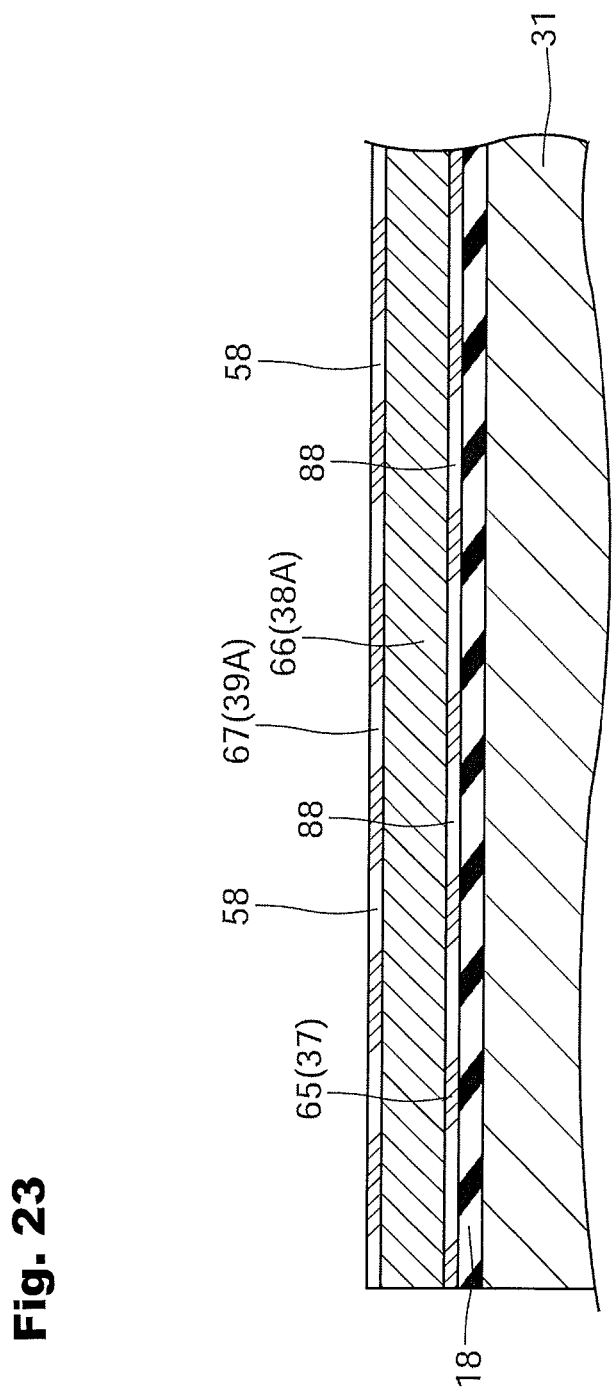
FIG. 23 is a sectional view illustrating a principal part of a process subsequent to that in FIG. 21.
Figure 24:
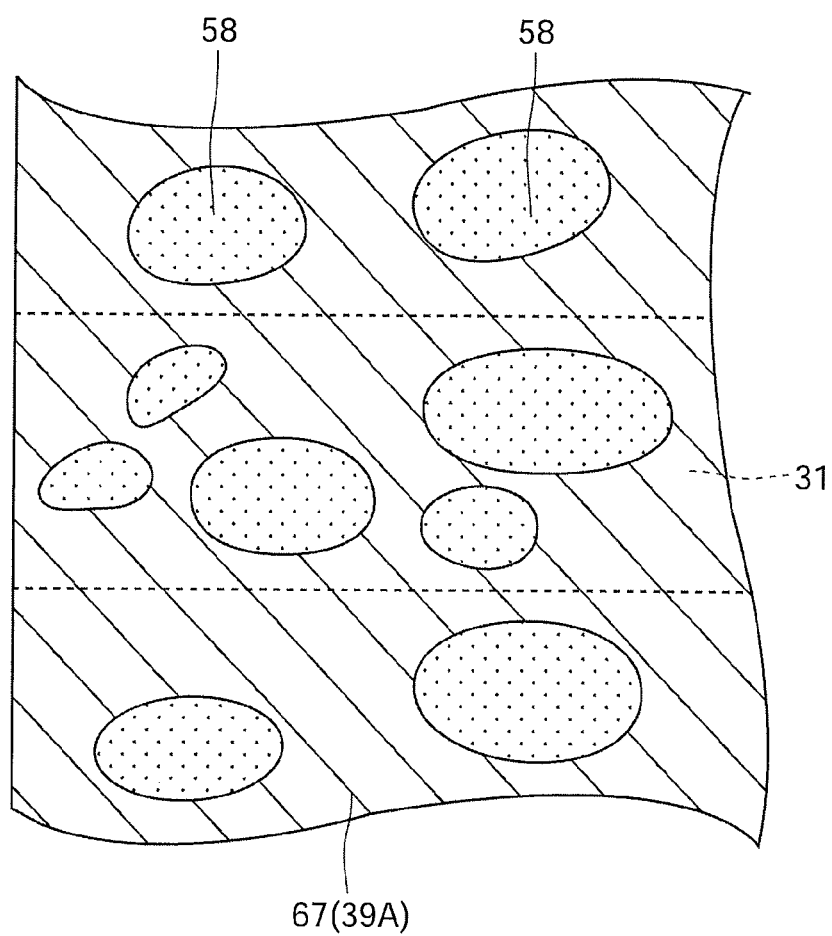
FIG. 24 is a plan view corresponding to FIG. 23.

Subsequently, a second metal layer forming step is performed. In this second metal layer forming step, a second metal layer 67 having thin-film like form is formed on the first metal layer 66, as illustrated in FIG. 23, FIG. 24. The second metal layer 67 is formed along the direction intersecting the ABS 101, and it becomes the second thin-film metal layer 39A afterward. The second metal layer 67 is able to be formed with the above-described second metal for example, by sputtering.

Thereafter, the metal layer defect step is performed on the second metal layer 67. In the metal layer defect step, the plurality of defect parts 58 are formed in the second metal layer 67 as illustrated in FIG. 23, FIG. 24. In this case, the defect parts 58 are formed such that the flat layer part 59 surrounds the plurality of defect parts 58 respectively and the flat layer part 59 continues without a break. Thus, the metal layer defect step is performed so that the second metal layer 67 has the net-like structure composed of the plurality of defect parts 58 and the flat layer part 59. The metal layer defect step can be performed, for example, by the electron beam irradiation method as in the closely adhesive layer defect step.

Figure 25:
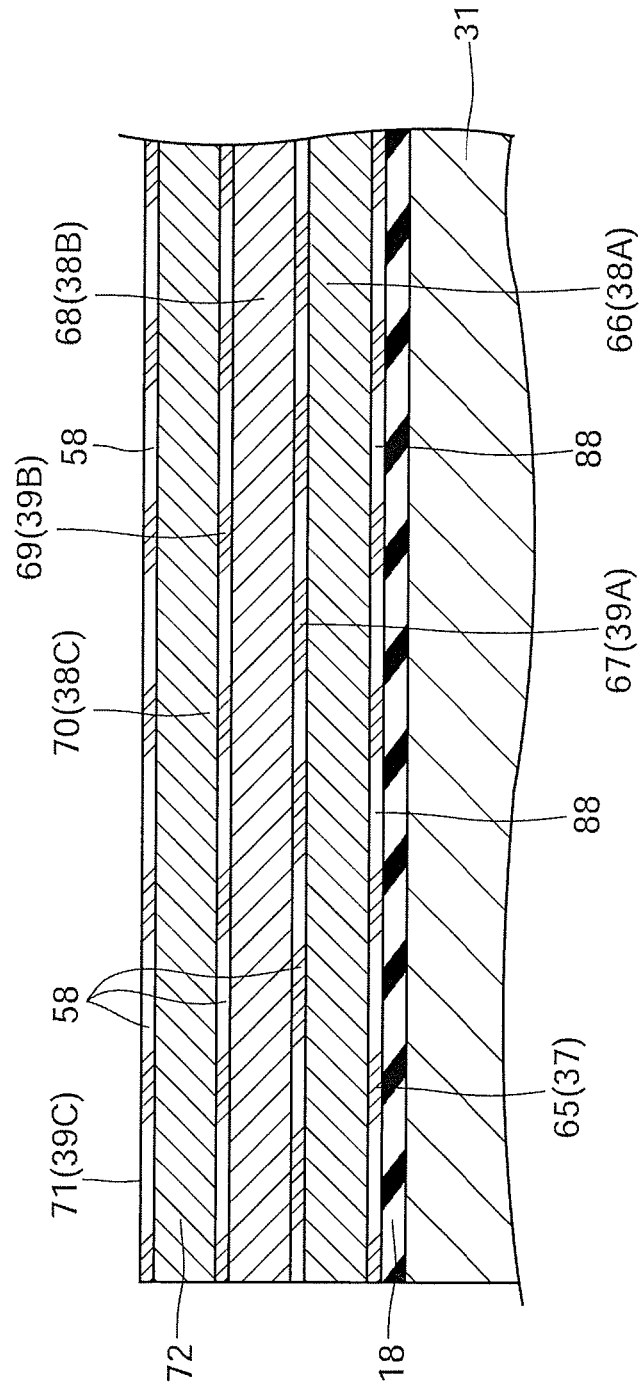
FIG. 25 is a sectional view illustrating a principal part of a process subsequent to that in FIG. 23.
Figure 26:
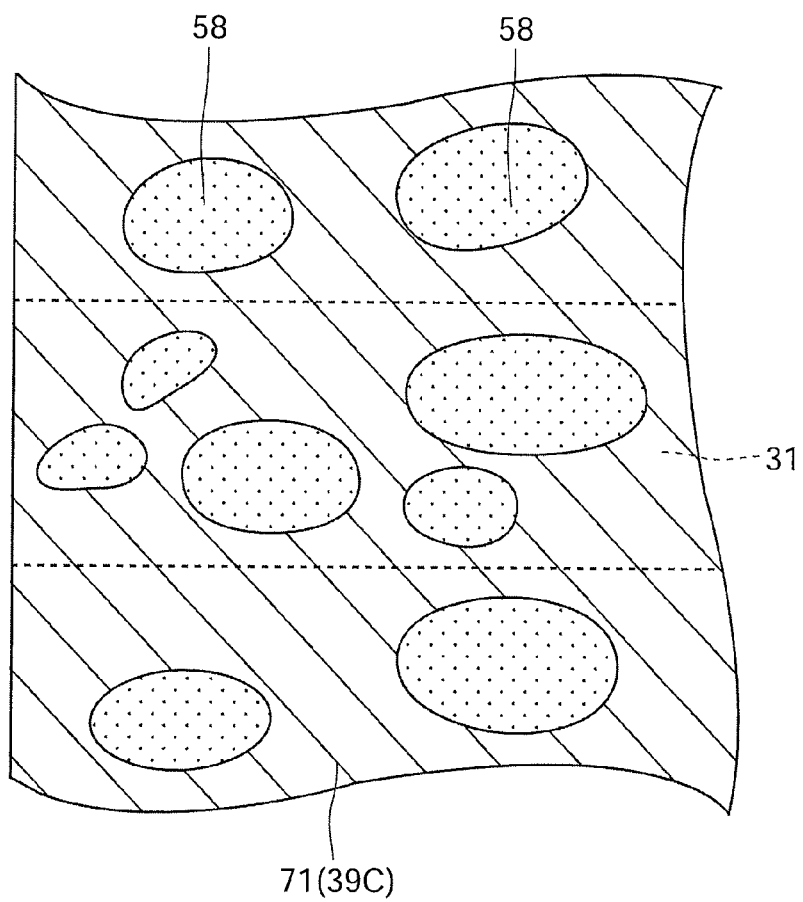
FIG. 26 is a plan view corresponding to FIG. 25.

Next, the first metal layer forming step is performed again. In this step, a first metal layer 68 having thin-film like form is formed, as illustrated in FIG. 25, FIG. 26. The first metal layer 68 will become the first thin-film metal layer 38B afterward.

Thereafter, the second metal layer forming step is performed to form a second metal layer 69 which will become the second thin-film metal layer 39B afterward. Subsequently, the metal layer defect step is performed on the second metal layer 69 to form the plurality of defect parts 58. Further, the first metal layer forming step is performed again to form a first metal layer 70 which will become the first thin-film metal layer 38C afterward. Thereafter, the second metal layer forming step is performed again to form a second metal layer 71 which will become the second thin-film metal layer 39C afterward. By forming the second metal layer 71, the second metal layer forming step is performed such that the second metal layer 71 is laminated on the outside most distant from the optical waveguide 31. Then, the metal layer defect step is performed on the second metal layer 71 to form the plurality of defect parts 58. Thus, a metal laminated part 72 which will become the near-field light generating layer 28 afterward is formed.

Next, a photomask is formed on the metal laminated part 72 using a photoresist and then, for example, RIE or ion beam etching is performed using the photomask to pattern the metal laminated part 72. By removing an unnecessary portion of the metal laminated part 72 in this manner, the above-described near-field light generating layer 28 is formed.

Next, as illustrated in FIG. 1, the surrounding insulating layer 32 is formed using an insulating material such as alumina ($Al_2O_3$) or the like on the surface of the laminated body. Subsequently, the surface of the laminated body is polished by CMP until the surface of the near-field light generating layer 28 emerges.

Subsequently, the heat sink 35 is formed so as to cover a part of the near-field light generating layer 28 and a part of the surrounding insulating layer 32.

Next, an insulating layer 33 is formed so as to cover the heat sink 35. Next, an insulating layer 29 is formed so as to cover the insulating layer 33. After that, etching is performed selectively to the interposed layer 18 and the insulating layers 32, 33, 29.

Next, the main magnetic pole layer 40 is formed on the ABS 101 side of the insulating layer 29, and the linking magnetic pole layer 42 is formed on a part distanced from the ABS 101.

After that, an insulating layer 49 is formed on the whole surface of the laminated body. The surface of the laminated body is polished by CMP afterward, until the surfaces of the main magnetic pole layer 40 and the linking magnetic pole layer 42 emerge. Furthermore, the upper thin-film coil 51 is formed on the insulating layer 49. After that, an insulating layer 52 is formed so as to cover the upper thin-film coil 51.

Then, the yoke magnetic pole layer 41 is formed so as to cover the main magnetic pole layer 40, the linking magnetic pole layer 42 and the insulating layer 52. After that, a protective insulating layer 60 is formed on the surface of the laminated body so as to cover the yoke magnetic pole layer 41. After that, the thermally assisted magnetic head 100 having the above-described structure is manufactured by being formed the ABS 101.

Modified Example 1

Figure 27:
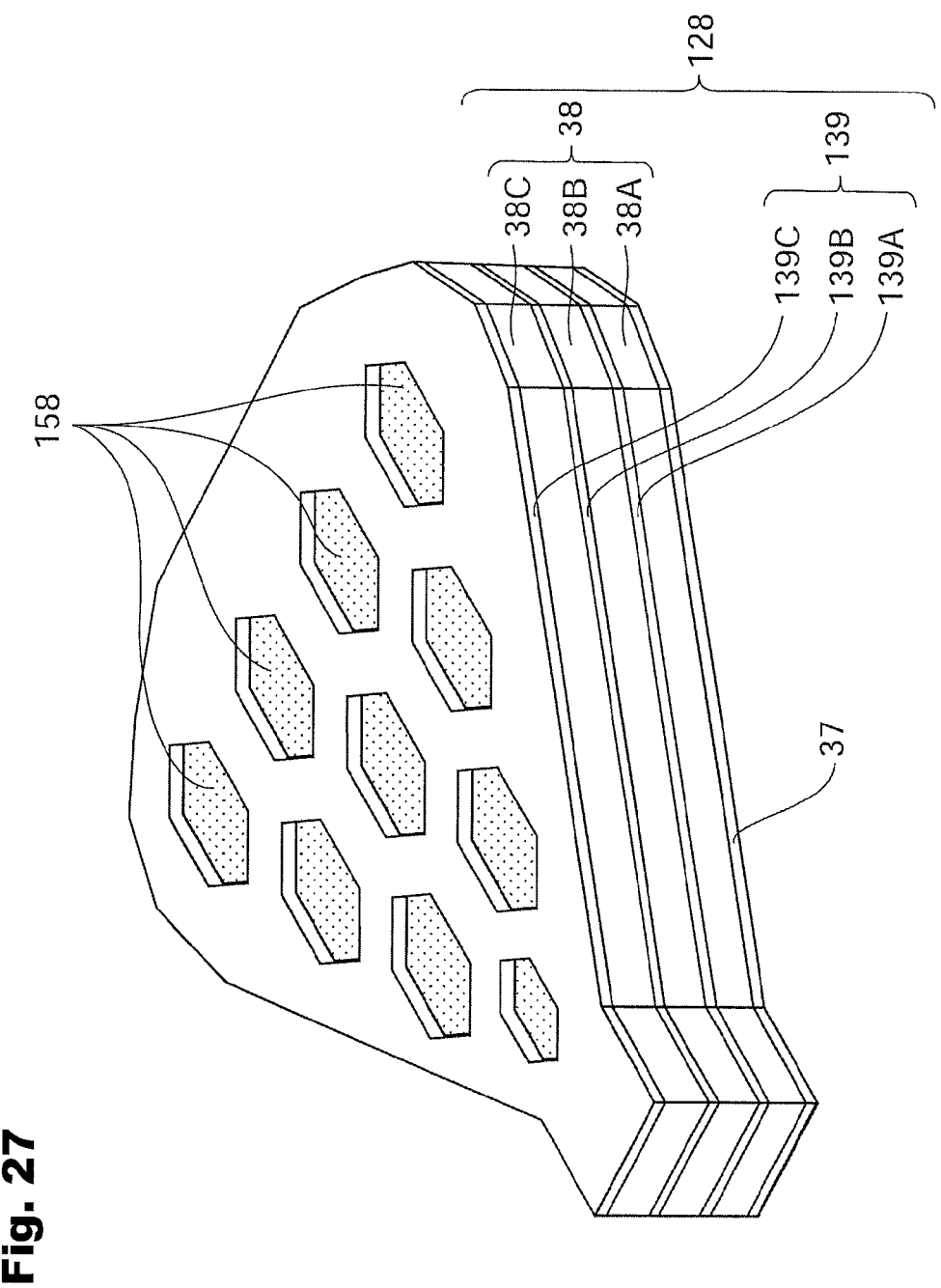
FIG. 27 is a perspective view illustrating the near-field light generating layer and closely adhesive layer according to a modified example 1.

Successively, the near-field light generating layer 128 in accordance with modified example illustrated in FIG. 27 will be explained. FIG. 27 is a perspective view illustrating the near-field light generating layer 128 and closely adhesive layer 37 according to a modified example. The near-field light generating layer 128 is different in that it has second thin-film metal layers 139 (139A, 139B, 139C) in place of the second thin-film metal layers 39 (39A, 39B, 39C), as compared with the near-field light generating layer 28.

The respective second thin-film metal layers 139A, 139B, 139C are different in that a plurality of defect parts 158 are formed in place of the plurality of defect parts 58 as compared with the respective second thin-film metal layers 39A, 39B, 39C.

In the case of the above-described near-field light generating layer 28, every one of the plurality of defect parts 58 is formed in an approximately oval shape but non-uniform in size and shape, and thus has no regularity in arrangement spot.

In contrast to the above, every one of the plurality of defect parts 158 is formed in a hexagonal shape and their size are also unified except for a part of them. Further, the vertical and lateral intervals thereof are unified and the directions in which they are arranged are also unified. The number of arranged defect parts 158 regularly changes to be one, two, three, four toward the direction more distant from the ABS 101 side so that the defect parts 158 have regularity also in arrangement spot.

By forming the plurality of defect parts 158, the second thin-film metal layer 139A, 139B, 139C has a structure approximate to the honeycomb structure (also referred to as a quasi-honeycomb structure).

Generally, the honeycomb structure is a structure in which regular hexagons are arranged without gap therebetween, and is known as a structure which can maintain the strength of the member formed with the structure while reducing its volume. The second thin-film metal layer 139A, 139B, 139C has the quasi-honeycomb structure approximate to the honeycomb structure, so that the volume of the material constituting the respective second thin-film metal layer, namely, the second metal can be reduced even though it can maintain the strength.

Accordingly, since the volume of the second metal is reduced, the volume of heat generation can further be suppressed in the near-field light generating layer 128, and it can be more efficiently prevented from melting, deforming, and projecting due to heat generation.

Modified Example 2

Figure 28:
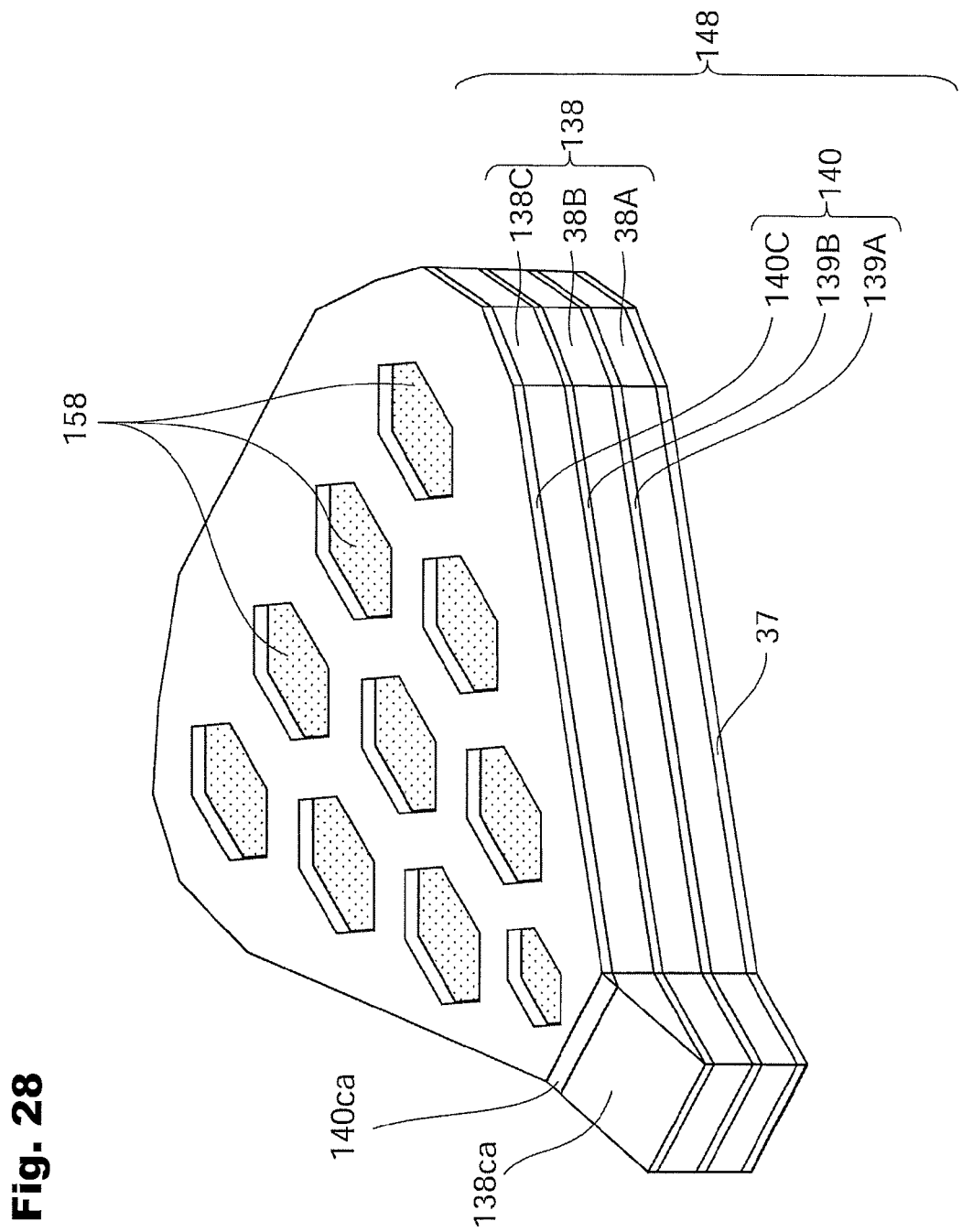
FIG. 28 is a perspective view illustrating the near-field light generating layer and closely adhesive layer according to a modified example 2.

Next, the near-field light generating layer 148 in accordance with modified example illustrated in FIG. 28 will be explained. FIG. 28 is a perspective view illustrating the near-field light generating layer 148 and closely adhesive layer 37. The near-field light generating layer 148 is different in that it has first thin-film metal layers 138 (38A, 38B, 138C) in place of the first thin-film metal layers 38 (38A, 38B, 38C), and it has second thin-film metal layers 140 (139A, 139B, 140C) in place of the second thin-film metal layers 139 (139A, 139B, 139C) as compared with the above-described near-field light generating layer 128.

The first thin-film metal layers 138 are different in that they have a first thin-film metal layer 138C in place of the first thin-film metal layer 38C as compared with the first thin-film metal layers 38. The first thin-film metal layer 138C is different in that a sloping surface 138Ca is formed on the ABS 101 side as compared with the first thin-film metal layer 38C.

The second thin-film metal layers 140 are different in that they have second thin-film metal layer 140C in place of the second thin-film metal layer 139C. The second thin-film metal layer 140C is different in that a sloping surface 140Ca is formed on the ABS 101 side as compared with the second thin-film metal layer 139C.

In the near-field light generating layer 148, the second thin-film metal layers 139A, 139B, 140C have the quasi-honeycomb structure as in the near-field light generating layer 128, so that the volume of the second metal constituting the respective second thin-film metal layer can be reduced even though it can maintain the strength. Accordingly, the near-field light generating layer 148 can also suppress its own volume of heat generation and can be more efficiently prevented from melting, deforming, and projecting due to heat generation as with the near-field light generating layer 128.

To efficiently generate the near-field light by the near-field light generating layer 128, it is desirable to have the plurality of first thin-film metal layers 38A, 38B, 38C which are formed to be large in thickness as in the near-field light generating layer 128.

This, however, increases the thickness of the near-field light generating layer 128 as a whole, so that the near-field light generating layer 128 exposed to the ABS 101 may increase in height. This makes it difficult to keep the height of the near-field light generating layer 128 exposed to the ABS 101 in a fixed size.

In this case, it is desirable to form sloping surfaces like the sloping surfaces 138Ca, 140Ca on the ABS 101 side as in the near-field light generating layer 148. Formation of the sloping surfaces like the sloping surfaces 138Ca, 140Ca makes it possible to keep the height of the near-field light generating layer 148 exposed to the ABS 101 in a fixed size while the near-field light generating layer 148 is made large in height.

Modified Example 3

Figure 29:
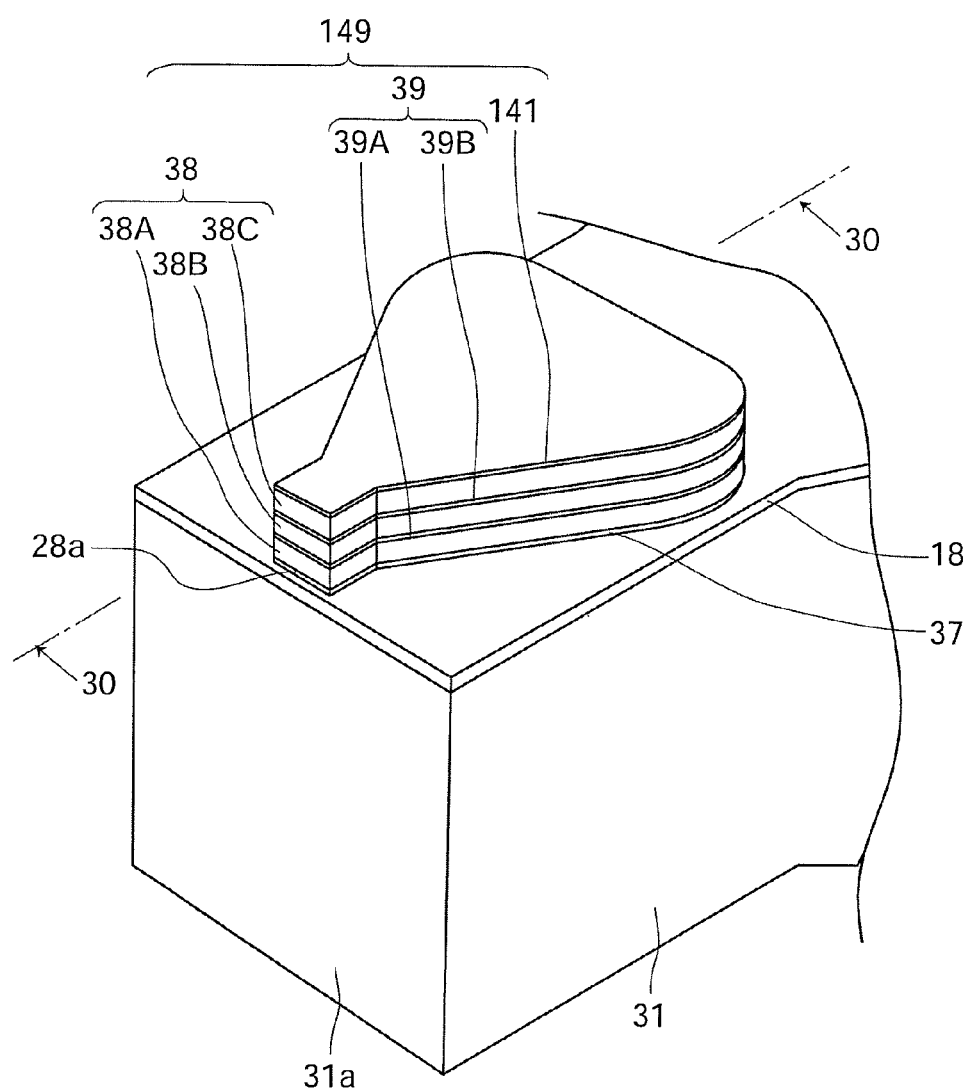
FIG. 29 is a perspective view illustrating principal parts of the near-field light generating layer, the interposed layer and optical waveguide.
Figure 30:
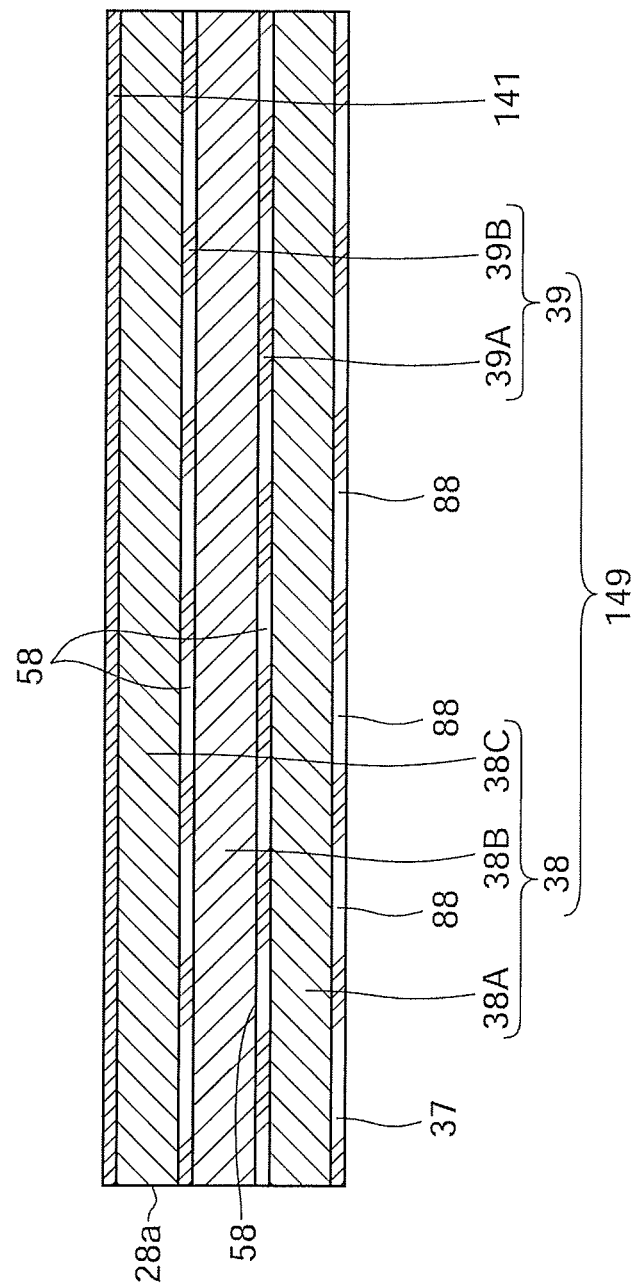
FIG. 30 is a sectional view of the near-field light generating layer and closely adhesive layer taken along the line 30-30 in FIG. 29.

Further, in the thermally assisted magnetic head 100 in accordance with an embodiment of the present invention, a near-field light generating layer 149 illustrated in FIG. 29, FIG. 30 may be formed in place of the near-field light generating layer 28.

The near-field light generating layer 149 is different in that it has a protective layer 141 in place of the second thin-film metal layer 39C as compared with the above-described near-field light generating layer 28. The protective layer 141 is a layer for preventing a material constituting the first thin-film metal layer 38C from diffusing. The protective layer 141 is formed of a dielectric substance. The protective layer 141 is able to form with either one of $SiO_2$, alumina, MgO, $ZrO_2$, Amorphous SiC for example.

The protective layer 141 is not formed with the plurality of defect parts 58 unlike the second thin-film metal layer 39C, but the near-field light generating layer 149 has the second thin-film metal layers 39A, 39B each having the plurality of defect parts 58 and the flat layer part 59. Accordingly, the near-field light generating layer 149 is also able to suppress its own volume of heat generation and is able to be prevented from melting, deforming, and projecting due to heat generation.

Modified Example 4

Figure 31:
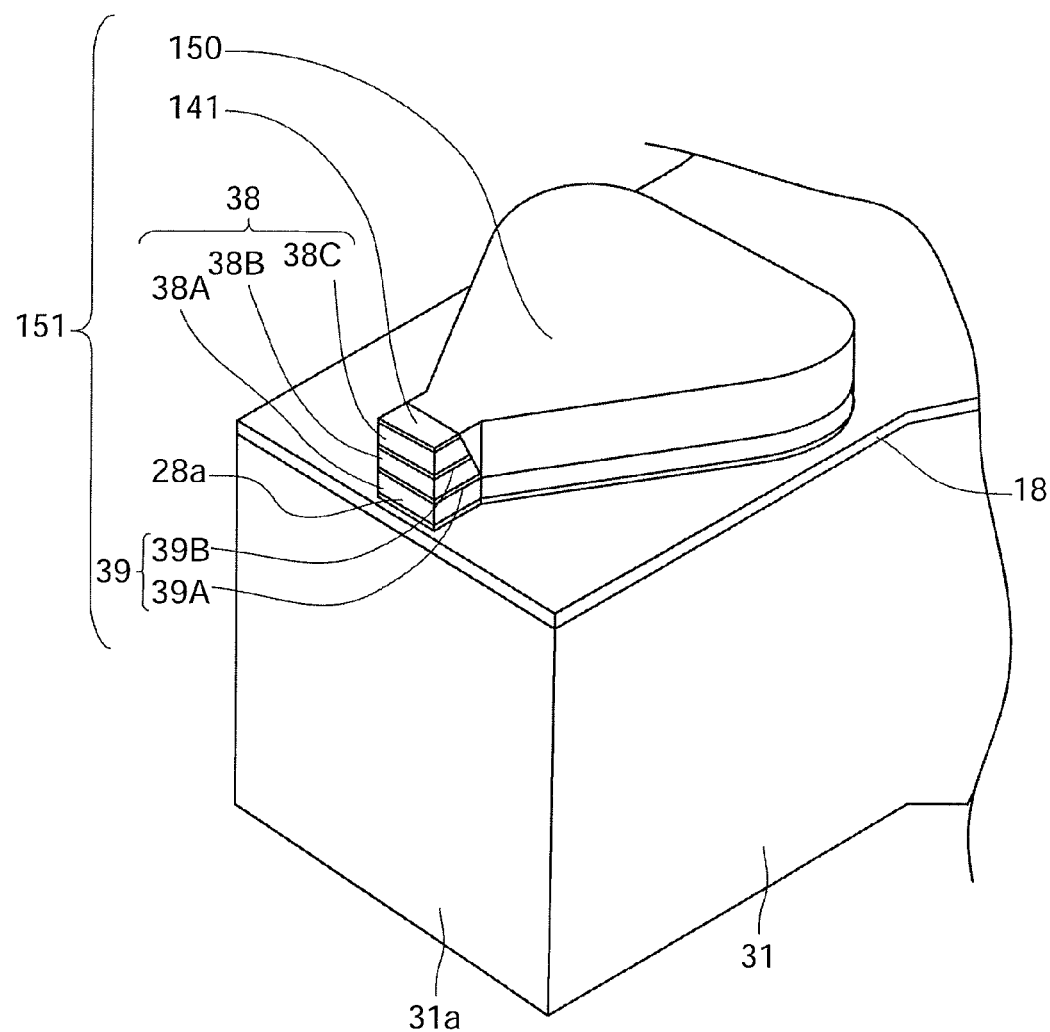
FIG. 31 is a perspective view illustrating principal parts of the near-field light generating layer, closely adhesive layer, the interposed layer and optical waveguide.
Figure 32:
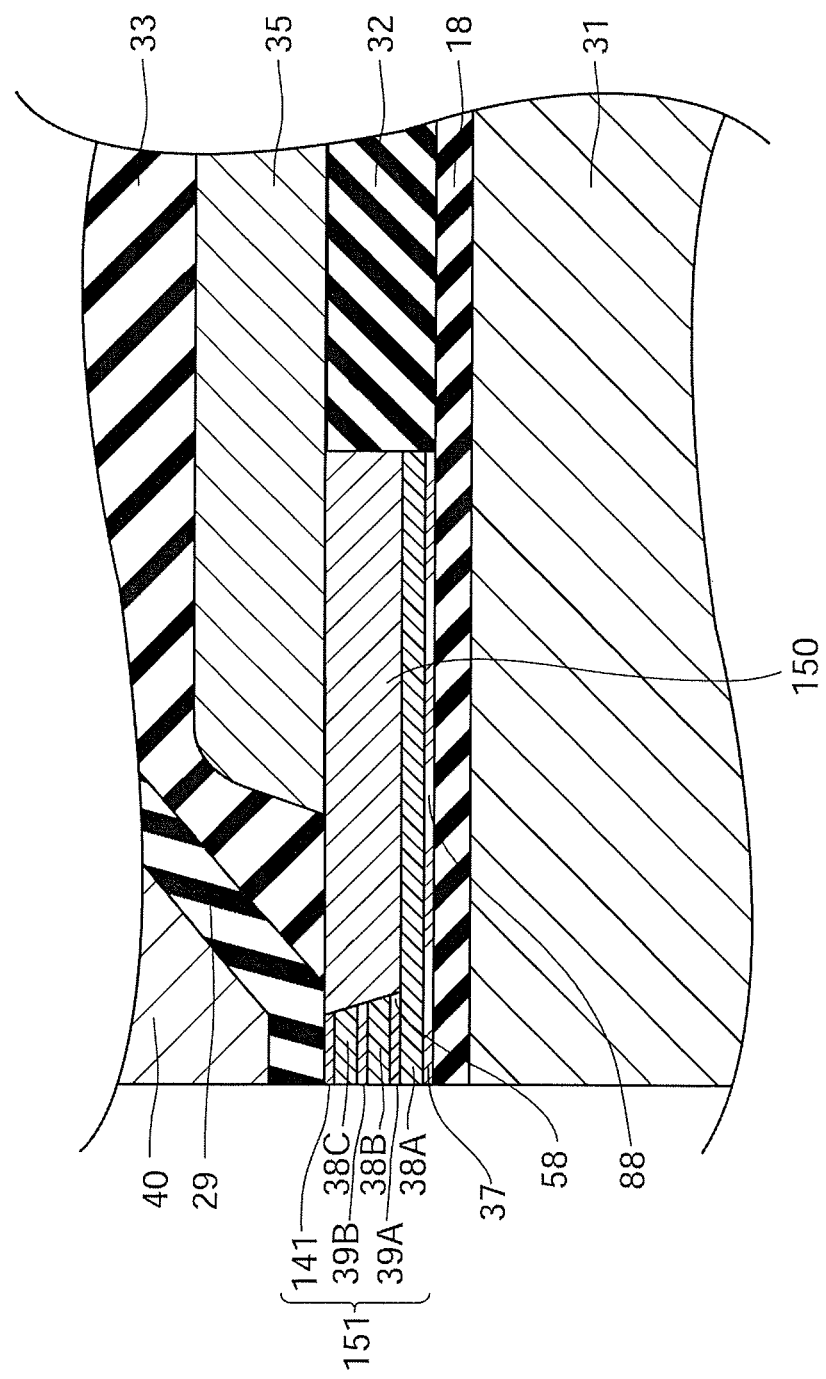
FIG. 32 is a sectional view of the thermally assisted magnetic head, corresponding to FIG. 9, having the near-field light generating layer illustrated in FIG. 31.

Further, in the thermally assisted magnetic head 100 in accordance with an embodiment of the present invention, a near-field light generating layer 151 illustrated in FIG. 31 to FIG. 32 may be formed in place of the near-field light generating layer 149.

The near-field light generating layer 151 is different in that it has a metal component part 150 as compared with the above-described near-field light generating layer 149. The metal component part 150 is disposed at a part distanced from the ABS 101, in the first thin-film metal layers 38B, 38C and second thin-film metal layers 39A, 39B. The metal component part 150 is formed of the first metal. The second thin-film metal layers 39A, 39B made of the second metal are arranged on the ABS 101 side of the near-field light generating layer 151. Therefore, in the near-field light generating layer 151, mechanical strength is able to increase in a part which influence due to melting and deformation likely to occur, and prevent from deforming and projecting.

Further, the volume of the second metal in the near-field light generating layer 151 is reduced as compared with that in the near-field light generating layer 149 because the metal component part 150 is disposed. In addition to that, the second thin-film metal layer 39A, 39B have the net-like structure to further reduce the volume of the second metal contained in the near-field light generating layer 151.

Modified Example 5

Figure 33:
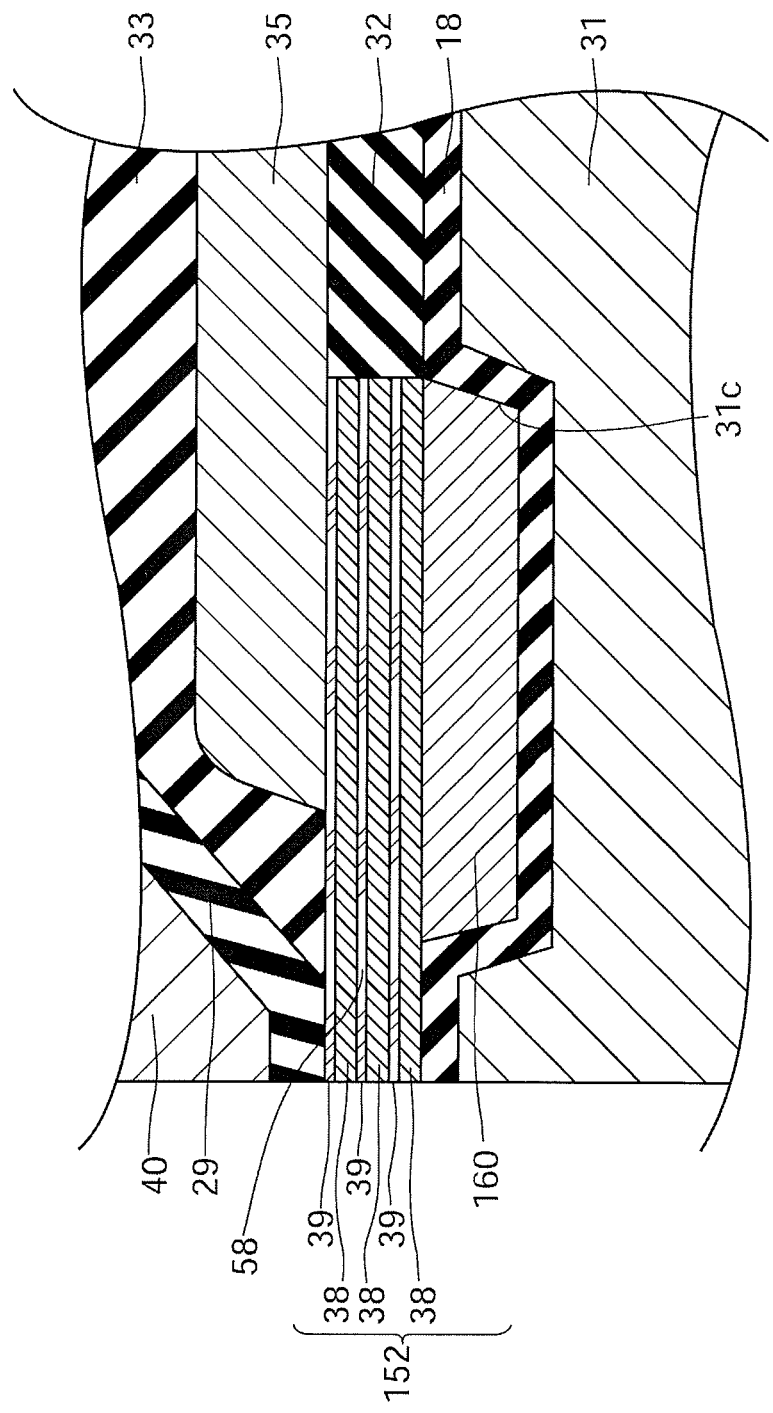
FIG. 33 is a sectional view of the thermally assisted magnetic head, corresponding to FIG. 9, having the near-field light generating layer according to a modified example 5.

Further, in the thermally assisted magnetic head 100 in accordance with an embodiment of the present invention, a near-field light generating layer 152 illustrated in FIG. 33 may be formed in place of the near-field light generating layer 28.

The near-field light generating layer 152 is different in that it has a metal component part 160 as compared with the above-described near-field light generating layer 28. The metal component part 160 is formed with the above-described first metal. The metal component part 160 is formed in a depression 31c of the optical waveguide 31. The depression 31c is formed on the upper end face 31b of the optical waveguide 31. The interposed layer 18 is inserted in the depression 31c, and the metal component part 160 is formed on the interposed layer 18. The metal component part 160 is connected to the first thin-film metal layer 38 (38A) on the substrate 1 side of the near-field light generating layer 152.

The near-field light generating layer 152 has the metal component part 160 and is thus high in electric conductivity as a whole but is likely to be low in mechanical strength as a whole because the metal component part 160 is formed using the first metal.

The near-field light generating layer 152 has, however, the second thin-film metal layers 39A, 39B, 39C and thus can be prevented from being reduced in mechanical strength. In addition, since each of them has the net-like structure, the volume of the second metal contained in the near-field light generating layer 152 can be reduced. Accordingly, the near-field light generating layer 152 can also be prevented from melting, deforming, and projecting from the ABS 101 due to its own heat generation.

Figure 34:
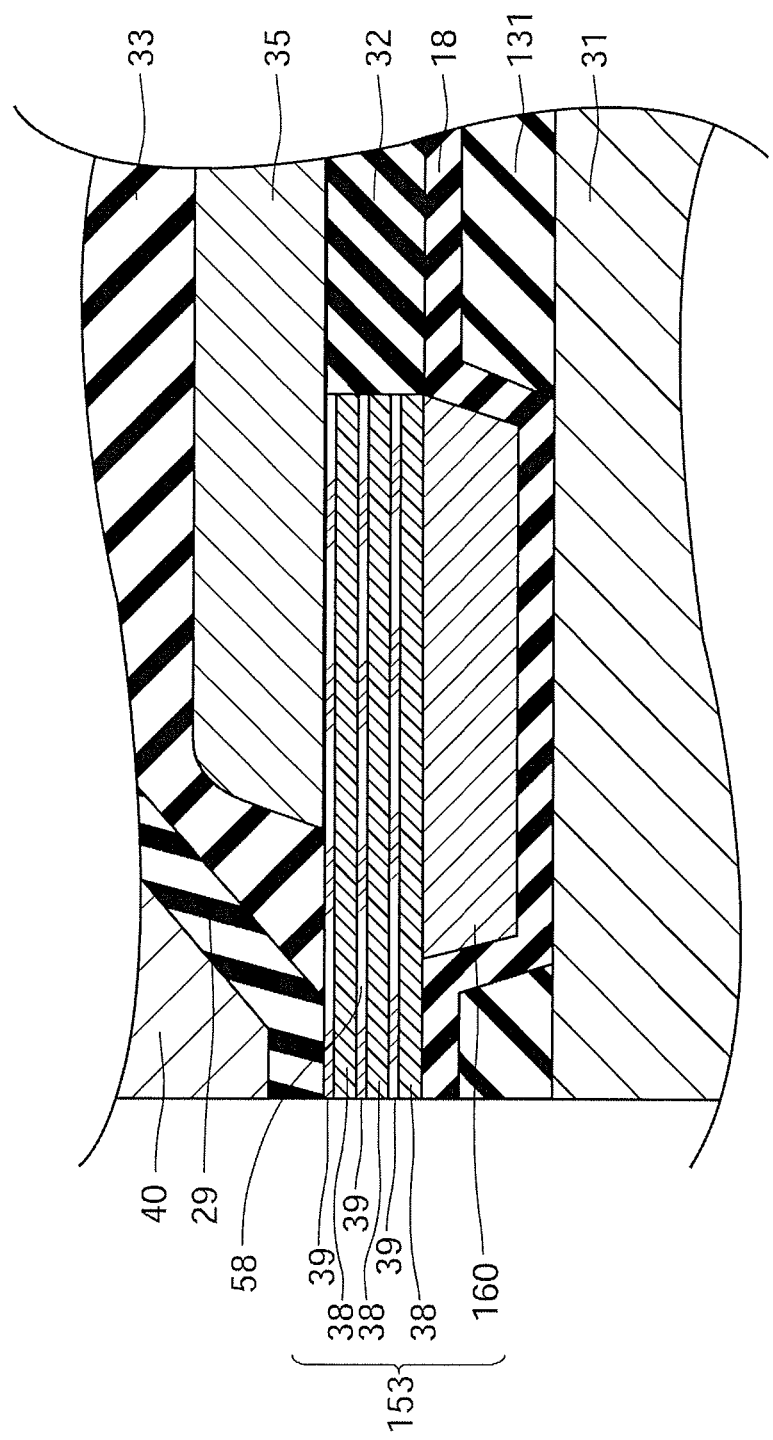
FIG. 34 is a sectional view of the thermally assisted magnetic head, corresponding to FIG. 9, having the near-field light generating layer according to another modified example 5.

Note that a dielectric substance layer 131 may be formed on the upper end face 31b side of the optical waveguide 31, as illustrated in FIG. 34. The dielectric substance layer 131 is formed on the upper end face 31b. A depression may be formed in the dielectric substance layer 131, and the metal component part 160 may be formed in the depression.

Modified Example 6

Figure 35:
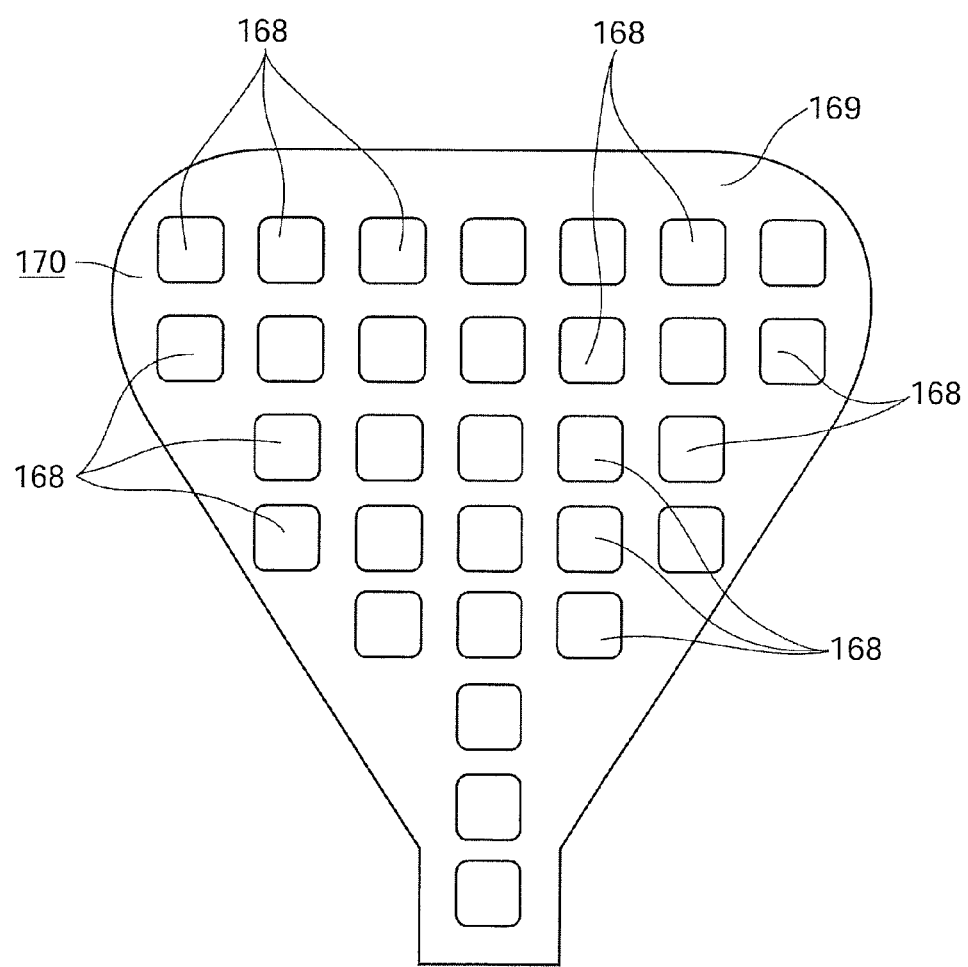
FIG. 35 is a plan view of the second thin-film metal layer according to a modified example 6.

Furthermore, the near-field light generating layer 28 may have a second thin-film metal layer 170 as illustrated in FIG. 35, in place of the second thin-film metal layer 39. A plurality of defect parts 168 and a flat layer part 169 are formed in the second thin-film metal layer 170. The respective defect parts 168 are formed rectangular shape having equal size. Further, an interval in every direction is unified, and an arrangement direction is also unified, about respective defect parts 168. An arrangement spot has also regularity.

The second thin-film metal layer 170 can maintain its strength while reducing the volume of the second metal, and thus can provide the same operation and effect as those of the second thin-film metal layer 39.

Figure 36A:
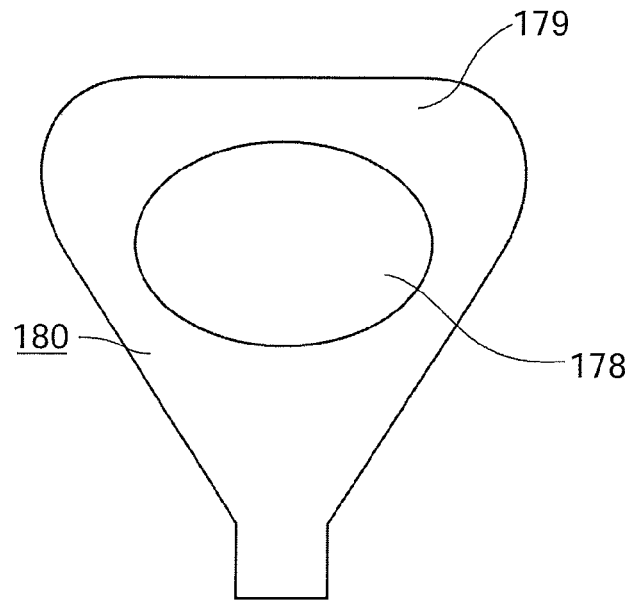
FIG. 36 (A) is a plan view illustrating the second thin-film metal layer 180 according to a modified example, FIG. 36 (B) is a plan view illustrating the second thin-film metal layer 181 according to a modified example.
Figure 36B:
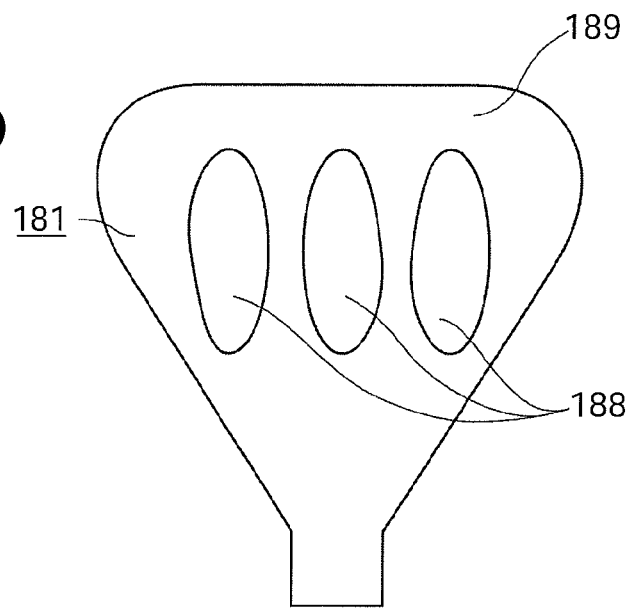

Besides, the near-field light generating layer 28 may have second thin-film metal layer 180 as illustrated in FIG. 36 (A), in place of the second thin-film metal layer 39. Further, the near-field light generating layer 28 may have second thin-film metal layer 181 as illustrated in FIG. 36 (B).

A defect part 178 having approximately oval shape is formed at the almost center of the second thin-film metal layer 180, and a flat layer part 179 is formed so as to surround the defect part 178. Three defect parts 188 having approximately oval shape are formed in the second thin-film metal layer 181, and a flat layer part 189 is formed so as to surround the respective defect parts 188.

Modified Example 7

Figure 37:
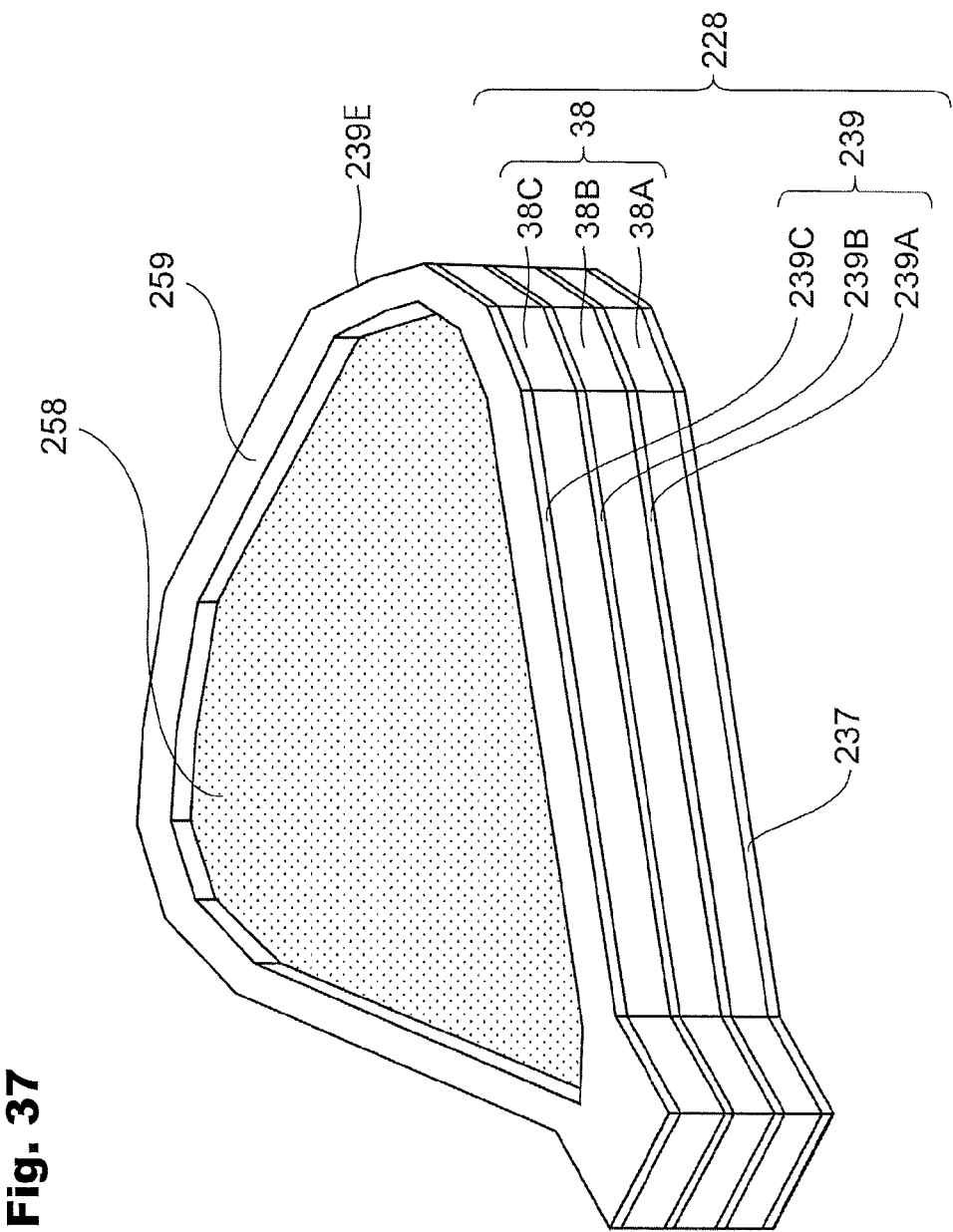
FIG. 37 is a perspective view illustrating the near-field light generating layer and closely adhesive layer according to a modified example 7.
Figure 38:
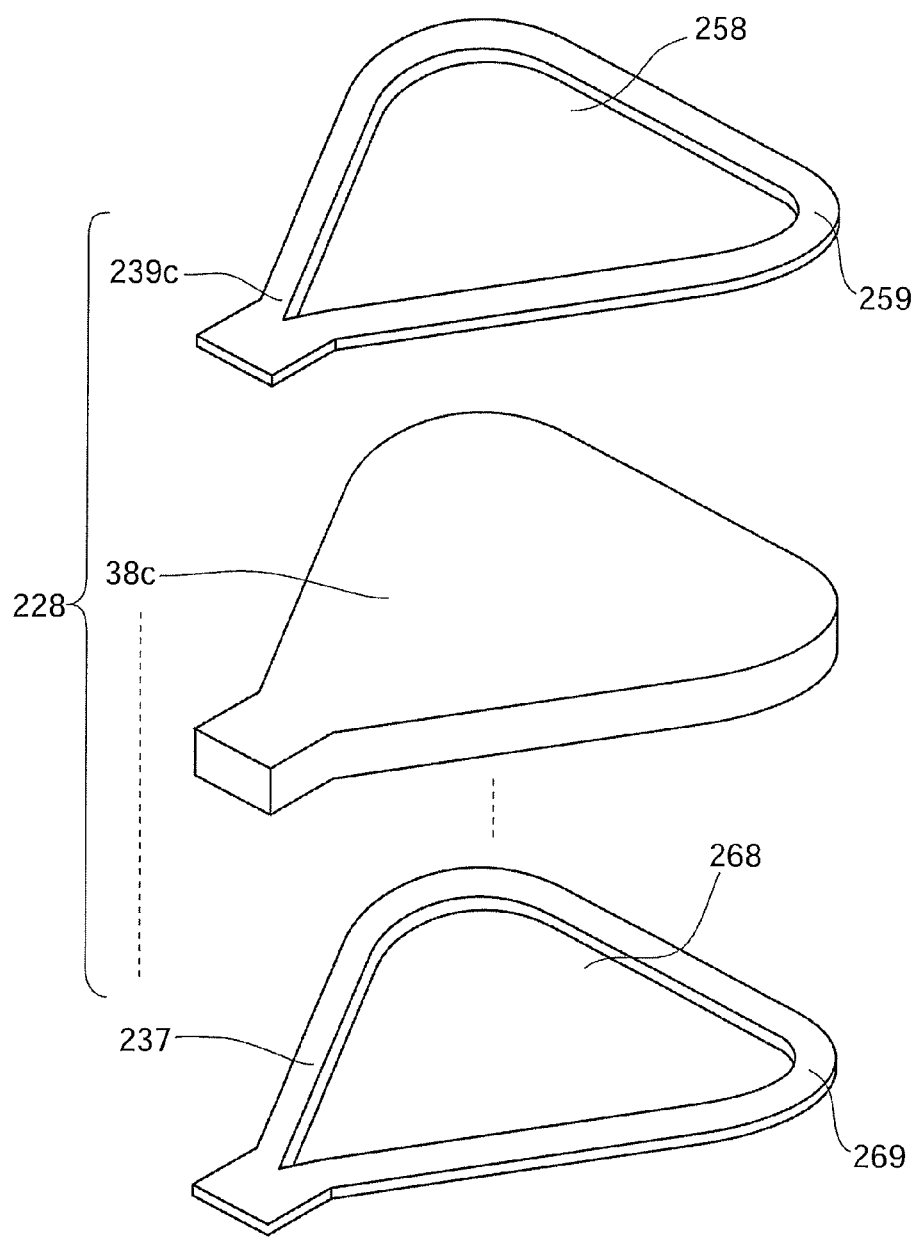
FIG. 38 is an exploded perspective view of the near-field light generating layer and closely adhesive layer according to a modified example 7, which are partially omitted.

Next, a near-field light generating layer 228 and closely adhesive layer 237 in accordance with modified example illustrated in FIG. 37, 38 will be explained. FIG. 37 is a perspective view illustrating the near-field light generating layer 228 and closely adhesive layer 237. FIG. 38 is an exploded perspective view of the near-field light generating layer 228 and closely adhesive layer 237, which are partially omitted.

The near-field light generating layer 228 is different in that it has second thin-film metal layers 239 (239A, 239B, 239C) in place of the second thin-film metal layers 39 (39A, 39B, 39C) as compared with the above-described near-field light generating layer 28.

The second thin-film metal layers 239 (239A, 239B, 239C) are different in that any one of them have one defect part 258 and flat layer part 259 in place of the plurality of defect parts 58 and flat layer part 59, as compared with the second thin-film metal layers 39 (39A, 39B, 39C). Only one the defect part 258 is formed inside of the flat layer part 259. The flat layer part 259 is formed along an outer peripheral part 239E of the second thin-film metal layers 239. The flat layer part 259 has a narrow band shape of a part, distanced from the outer peripheral part 239E at an almost regular interval.

Since the flat layer part 259 is formed in an annular shape trimming narrowly the outside of one defect part 258 as in the illustration, the second thin-film metal layer 239 has an annular structure composed of the defect part 258 and the flat layer part 259.

In the second thin-film metal layer 239, since the flat layer part 259 is formed along the outer peripheral part 239E which is sensitive to deformation, the volume of the second metal contained in the near-field light generating layer 228 can be reduced while the reduction in mechanical strength is prevented. Accordingly, the near-field light generating layer 228 can also be prevented from melting, deforming, and projecting from the ABS 101 due to its own heat generation.

Further, the closely adhesive layer 237 is different in that it has one closely adhesive layer defect part 268 and one closely adhesive layer flat layer part 269 in place of the plurality of closely adhesive layer defect parts 88 and the closely adhesive layer flat layer part 89, as compared with the closely adhesive layer 37. Only one closely adhesive layer defect part 268 is formed inside the closely adhesive layer flat layer part 269. The closely adhesive layer flat layer part 269 is formed in the same narrow band shape as that of the flat layer part 259. The closely adhesive layer 237 has the same annular structure as that of the second thin-film metal layer 239. The volume of the closely adhesive layer 237 is also reduced while the mechanical strength is maintained as a whole.

Figure 39:
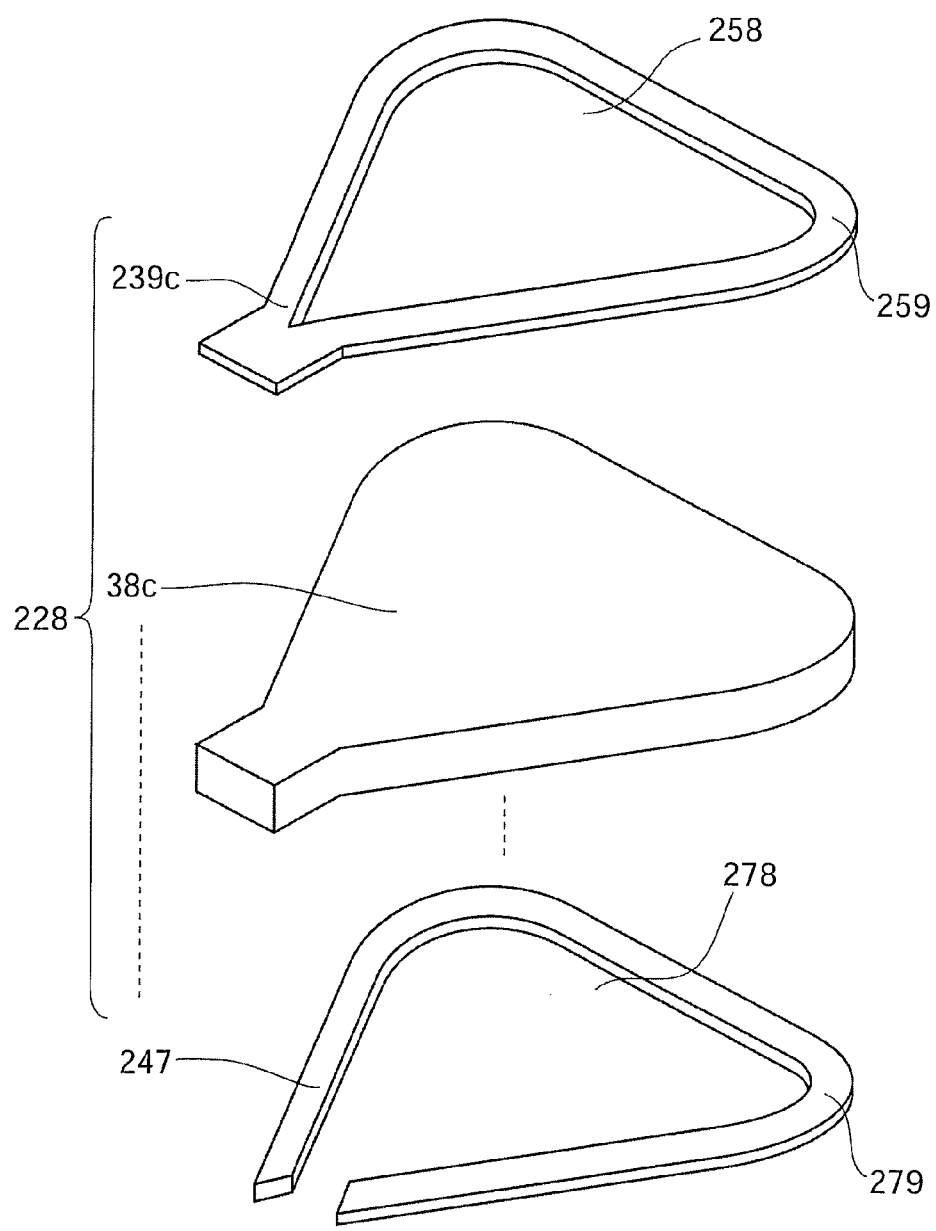
FIG. 39 is an exploded perspective view of the near-field light generating layer and another closely adhesive layer according to a modified example 7, which are partially omitted.

Further, a closely adhesive layer 247 illustrated in FIG. 39 may be formed in place of the closely adhesive layer 237, about the near-field light generating layer 228. The closely adhesive layer 247 has a closely adhesive layer defect part 278 and a closely adhesive layer flat layer part 279. Though the closely adhesive layer flat layer part 279 is formed by narrow band shape similar to the closely adhesive layer flat layer part 269, a part of the closely adhesive layer flat layer part 279 near the ABS 101 is divided. The volume of the closely adhesive layer 247 is also reduced while the mechanical strength is maintained as a whole.

Since the part of closely adhesive layer 247 near the ABS 101 is divided, the size of the closely adhesive layer 247 being in contact with the near-field light generating layer 228 is small, as compared with closely adhesive layer 237. Accordingly, the near-field light is generated effectively by using the closely adhesive layer 247 than the closely adhesive layer 237.

Modified Example 8

Figure 40:
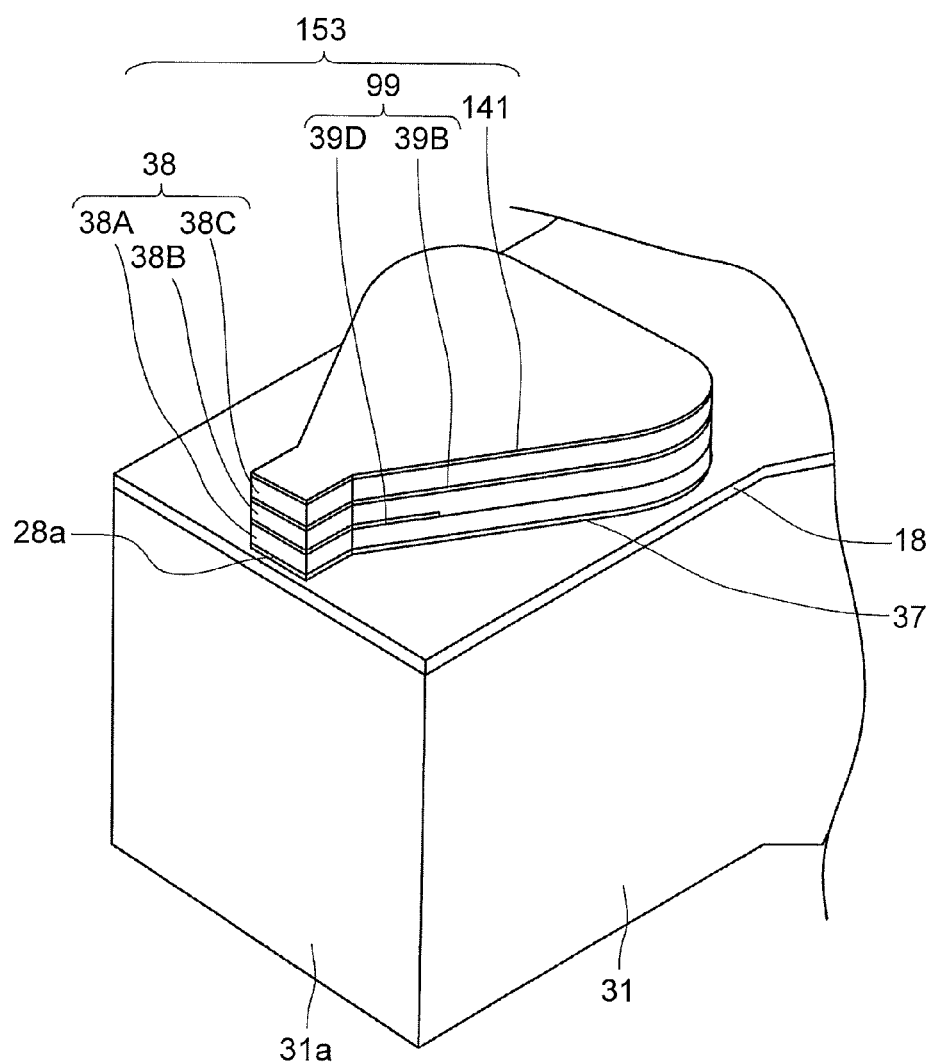
FIG. 40 is a perspective view illustrating principal parts of the near-field light generating layer, interposed layer and optical waveguide according to a modified example 8.

Furthermore, in the thermally assisted magnetic head 100 in accordance with an embodiment of the present invention, a near-field light generating layer 153 illustrated in FIG. 40 may be formed in place of the near-field light generating layer 28.

The near-field light generating layer 153 is different in that it has a second thin-film metal layer 99 in place of the second thin-film metal layers 39C, as compared with the above-described near-field light generating layer 149. The second thin-film metal layer 99 is different in that it has a second thin-film metal layer 39D in place of the second thin-film metal layer 39A, as compared with the second thin-film metal layer 39. A depth from the ABS 101 about the second thin-film metal layer 39D is small than that of the second thin-film metal layer 39A.

(Embodiments of Head Gimbal Assembly and Hard Disk Drive)

Next, embodiments of the head gimbal assembly and hard disk drive will now be explained with reference to FIG. 41.

FIG. 41 (a) is a perspective view showing a hard disk drive 201 equipped with the above-mentioned thermally assisted magnetic head 100. The hard disk drive 201 includes a hard disk (magnetic recording medium) 202 rotating at a high speed and a head gimbal assembly (HGA) 210. The hard disk drive 201 is an apparatus which actuates the HGA 210, so as to record/reproduce data onto/from recording surfaces of the hard disk 202. The hard disk 202 has a plurality of (4 in the drawing) platters. Each platter has a recording surface opposing its corresponding thermally assisted magnetic head 100.

The hard disk drive 201 positions a slider 230 on a track by an assembly carriage device 203. Further, the hard disk drive 201 has a plurality of drive arms 209. The drive arms pivot about a pivot bearing shaft 206 by means of a voice coil motor (VCM) 205, and are stacked in a direction along the pivot bearing shaft 206. Further, an HGA 210 is attached to the tip of each drive arm.

Further, the hard disk drive 201 has a semiconductor laser 207 generating laser light for heating, a control circuit 204 controlling recording/reproducing and the generation of light by the semiconductor laser 207, and an optical fiber 208 guiding the laser light to the slider 230. The HGA 210 will now be described with reference to FIG. 41 (b). FIG. 41 (b) is a perspective view illustrating a rear face side of the HGA 210. In the HGA 210, the slider 230 is fixed to a tip portion of a suspension 220. Further, in the HGA 210, one end portion of a wiring member 224 is electrically connected to a terminal electrode of the slider 230.

The suspension 220 has a load beam 222, a base plate 221 provided at a base portion of the load beam 222, a flexure 223 fixed to and supported on the load beam 222 from the tip end side to the front side of the base plate 221 and having elasticity, and the wiring member 224. The wiring member 224 has a lead conductor and connection pads electrically connected to both ends of the lead conductor.

Next, the slider 230 will be explained. The slider 230 has a slider base plate having the ABS 101 and a device formation part, and an output end part of the optical fiber 208 is inserted into the slider 230. Further, the thermally assisted magnetic head 100 is formed at the device formation part. This slider 230 floats from the magnetic recording medium 202 by a minute distance.

In the hard disk drive 201, when the HGA 210 is rotated, the slider 230 moves in a radial direction of the hard disk 202, i.e., a direction traversing track lines.

Since the aforementioned HGA 210 and hard disk drive 201 have the thermally assisted magnetic head 100, they are capable of preventing a melting and deformation of the near-field light generating layer, and are capable of preventing a deformation, melting and chipping of the magnetic layer arranged near the near-field light generating layer.

Though the above-mentioned embodiments explain a type in which a thin-film coil is wound like a flat spiral about the linking magnetic pole layer by way of example, the present invention is also applicable to a thermally assisted magnetic head of a type in which the thin-film coil is wound about the main magnetic pole layer.

What is claimed is:

1. A thermally assisted magnetic head comprising a main magnetic pole layer having a magnetic pole end face arranged within a medium-opposing surface opposing a magnetic recording medium; a near-field light generating layer having a generating end part arranged within the medium-opposing surface, the generating end part generating near-field light for heating the magnetic recording medium; and an optical waveguide guiding light to the near-field light generating layer,
wherein the near-field light generating layer has a laminated structure in which a first thin-film metal layer formed in a thin film form along a direction intersecting the medium-opposing surface and a second thin-film metal layer formed in a thin film form along the direction intersecting the medium-opposing surface and formed using a second metal larger in hardness than a first metal forming the first thin-film metal layer are alternately laminated, and
wherein in the second thin-film metal layer, a defect part is formed, the defect part is a part smaller in thickness than another part or is a hole part, and a flat layer part other than the defect part surrounds the defect part.

2. The thermally assisted magnetic head according to claim 1,
wherein in the near-field light generating layer, at least two second thin-film metal layers are laminated, and the first thin-film metal layer is laminated between the two second thin-film metal layers, and
wherein the second thin-film metal layer has a net-like structure in which a plurality of the defect parts are scattered not in contact with one another and the flat layer part surrounds the respective defect parts, the flat layer part continues without a break due to the defect parts.

3. The thermally assisted magnetic head according to claim 1,
wherein the optical waveguide has a waveguide end face arranged within the medium-opposing surface, and extends in a depth direction intersecting the medium-opposing surface from the waveguide end face, and has an upper end face on a side closer to the main magnetic pole layer,
wherein the thermally assisted magnetic head further comprises an interposed layer which is in direct contact with the upper end face of the optical waveguide, and a closely adhesive layer which makes the near-field light generating layer closely adhere to the interposed layer, and
wherein in the closely adhesive layer, a closely adhesive layer defect part similar to the defect part in the second thin-film metal layer is formed and a closely adhesive layer flat layer part other than the closely adhesive layer defect part surrounds the closely adhesive layer defect part.

4. The thermally assisted magnetic head according to claim 2,
wherein the optical waveguide has a waveguide end face arranged within the medium-opposing surface, and extends in a depth direction intersecting the medium-opposing surface from the waveguide end face, and has an upper end face on a side closer to the main magnetic pole layer,
wherein the thermally assisted magnetic head further comprises an interposed layer which is in direct contact with the upper end face of the optical waveguide, and a closely adhesive layer which makes the near-field light generating layer closely adhere to the interposed layer, and
wherein the closely adhesive layer has a net-like structure in which a plurality of closely adhesive layer defect parts similar to the defect parts in the second thin-film metal layer are scattered not in contact with one another and a closely adhesive layer flat layer part other than the closely adhesive layer defect parts surrounds the respective closely adhesive layer defect parts, the closely adhesive layer flat layer part continues without a break due to the closely adhesive layer defect parts.

5. The thermally assisted magnetic head according to claim 2,
wherein the second thin-film metal layer has a quasi-honeycomb structure approximate to a honeycomb structure in which each of the plurality of defect parts is formed in a hexagonal shape.

6. The thermally assisted magnetic head according to claim 1,
wherein the second thin-film metal layer has an annular structure, the annular structure is a structure in which a part of the second thin-film metal layer disposed along an outer peripheral part of it and distanced at an almost regular interval from the outer peripheral part is formed as the flat layer part, and only one defect part is formed inside the flat layer part.

7. The thermally assisted magnetic head according to claim 3,
wherein the closely adhesive layer has an annular structure, the annular structure is a structure in which a part of the closely adhesive layer disposed along an outer peripheral part of it and distanced at an almost regular interval from the outer peripheral part is formed as the closely adhesive layer flat layer part, and only one closely adhesive layer defect part is formed inside the closely adhesive layer flat layer part.

8. The thermally assisted magnetic head according to claim 1,
wherein the first thin-film metal layer is formed to be smaller in thickness than the second thin-film metal layer.

9. The thermally assisted magnetic head according to claim 4,
wherein in the near-field light generating layer, the second thin-film metal layer is laminated on the outside most distant from the optical waveguide.

10. The thermally assisted magnetic head according to claim 1,
wherein in the near-field light generating layer, only a near-field light generating part having the generating end part on the magnetic recording medium side has the laminated structure, and a metal component part formed using the first metal is disposed at a part more distant from the medium-opposing surface than is the near-field light generating part.

11. The thermally assisted magnetic head according to claim 1,
wherein in the near-field light generating layer, a sloping surface sloping with respect to the medium-opposing surface is formed in the near-field light generating part having the generating end part on the magnetic recording medium side.

12. The thermally assisted magnetic head according to claim 3,
wherein the optical waveguide has a depression formed on the upper end face, and
wherein the near-field light generating layer is formed integrally with a metal component part, the metal component part is formed inside the depression using the first metal.

13. A method of manufacturing a thermally assisted magnetic head comprising a main magnetic pole layer having a magnetic pole end face arranged within a medium-opposing surface opposing a magnetic recording medium; a near-field light generating layer having a generating end part arranged within the medium-opposing surface, the generating end part generating near-field light for heating the magnetic recording medium; and an optical waveguide guiding light to the near-field light generating layer, comprising a near-field light generating layer forming step of forming the near-field light generating layer, the near-field light generating layer forming step comprising:
a first metal layer forming step of forming a first metal layer in a thin film form along a direction intersecting the medium-opposing surface;
a second metal layer forming step of forming, on the first metal layer, a second metal layer in a thin film form along the direction intersecting the medium-opposing surface using a second metal larger in hardness than a first metal forming the first metal layer; and
a metal layer defect step of forming a defect part in the second metal layer, the defect part is a part smaller in thickness than another part or is a hole part, such that a flat layer part other than the defect part surrounds the defect part.

14. The method of manufacturing a thermally assisted magnetic head according to claim 13,
wherein the metal layer defect step is performed such that a plurality of the defect parts are scattered not in contact with one another and the flat layer part surrounds the respective defect parts, and the flat layer part continues without a break due to the defect parts, to make the second metal layer have a net-like structure composed of the plurality of defect parts and the flat layer part.

15. The method of manufacturing a thermally assisted magnetic head according to claim 13, further comprising:
an optical waveguide forming step of forming an optical waveguide on a surface of a laminated body to have a rectangular parallelepiped-shape part on a side of a planned opposing surface position which will become the medium-opposing surface afterward;
an interposed layer forming step of forming an interposed layer using a dielectric substance on an upper end face of the optical waveguide;
a metal thin-film layer forming step of forming a metal thin-film layer which becomes a closely adhesive layer afterward, the closely adhesive layer making the near-field light generating layer closely adhere to the interposed layer; and
a closely adhesive layer defect step of forming, in the metal thin-film layer, a closely adhesive layer defect part similar to the defect part in the second metal layer such that a closely adhesive layer flat layer part other than the closely adhesive layer defect part surrounds the closely adhesive layer defect part.

16. The method of manufacturing a thermally assisted magnetic head according to claim 15,
wherein the closely adhesive layer defect step is performed such that a plurality of the closely adhesive layer defect parts are scattered not in contact with one another and the closely adhesive layer flat layer part surrounds the respective closely adhesive layer defect parts, and the closely adhesive layer flat layer part continues without a break due to the closely adhesive layer defect parts to make the metal thin-film layer have a net-like structure composed of the plurality of closely adhesive layer defect parts and the closely adhesive layer flat layer part.

17. The method of manufacturing a thermally assisted magnetic head according to claim 14,
wherein the metal layer defect step is performed such that each of the plurality of defect parts is formed in a hexagonal shape to make the second metal layer have a quasi-honeycomb structure approximate to a honeycomb structure.

18. The method of manufacturing a thermally assisted magnetic head according to claim 13,
wherein the second metal layer forming step is performed such that the second metal layer is laminated on the outside most distant from the optical waveguide.

19. A head gimbal assembly comprising a slider having a thermally assisted magnetic head formed thereon,
wherein the thermally assisted magnetic head comprising:
a main magnetic pole layer having a magnetic pole end face arranged within a medium-opposing surface opposing a magnetic recording medium; a near-field light generating layer having a generating end part arranged within the medium-opposing surface, the generating end part generating near-field light for heating the magnetic recording medium; and an optical waveguide guiding light to the near-field light generating layer,
wherein the near-field light generating layer has a laminated structure in which a first thin-film metal layer formed in a thin film form along a direction intersecting the medium-opposing surface and a second thin-film metal layer formed in a thin film form along the direction intersecting the medium-opposing surface and formed using a second metal larger in hardness than a first metal forming the first thin-film metal layer are alternately laminated, and
wherein in the second thin-film metal layer, a defect part is formed, the defect part is a part smaller in thickness than another part or is a hole part, and a flat layer part other than the defect part surrounds the defect part.

20. A hard disk drive comprising a head gimbal assembly having a thermally assisted magnetic head, and a magnetic recording medium opposing the thermally assisted magnetic head,
wherein the thermally assisted magnetic head comprising:
a main magnetic pole layer having a magnetic pole end face arranged within a medium-opposing surface opposing a magnetic recording medium; a near-field light generating layer having a generating end part arranged within the medium-opposing surface, the generating end part generating near-field light for heating the magnetic recording medium; and an optical waveguide guiding light to the near-field light generating layer,
wherein the near-field light generating layer has a laminated structure in which a first thin-film metal layer formed in a thin film form along a direction intersecting the medium-opposing surface and a second thin-film metal layer formed in a thin film form along the direction intersecting the medium-opposing surface and formed using a second metal larger in hardness than a first metal forming the first thin-film metal layer are alternately laminated, and wherein in the second thin-film metal layer, a defect part is formed, the defect part is a part smaller in thickness than another part or is a hole part, and a flat layer part other than the defect part surrounds the defect part.

* * * * *